United States Patent
Kaneko et al.

(10) Patent No.: US 6,540,329 B1
(45) Date of Patent: Apr. 1, 2003

(54) IMAGE RECORDING METHOD, METHOD FOR IMPROVING QUALITY OF MULTICOLOR IMAGE, IMAGE RECORDING APPARATUS, INK SET, RECORDING UNIT, IMAGE FORMING METHOD, METHOD FOR IMPROVING IMAGE QUALITY, AND METHOD FOR FORMING MONOTONE IMAGE

(75) Inventors: Takumi Kaneko, Tokyo (JP); Nobuyuki Matsumoto, Tokyo (JP); Masao Kato, Kawasaki (JP); Daisaku Ide, Tokyo (JP); Koichi Osumi, Kawasaki (JP); Yoichi Takada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/663,847

(22) Filed: Sep. 15, 2000

(30) Foreign Application Priority Data

Sep. 17, 1999 (JP) .......................................... 11-263906
Sep. 1, 2000 (JP) ........................................ 2000-265668

(51) Int. Cl.[7] .................................................. B41J 2/25
(52) U.S. Cl. ............................ 347/43; 347/347; 347/96; 347/100
(58) Field of Search ........................... 347/15, 43, 400, 347/95, 96; 106/20 R, 31.27

(56) References Cited

U.S. PATENT DOCUMENTS

| 5,428,383 | A |   | 6/1995 | Shields et al. ................. 347/96 |
| 5,571,311 | A |   | 11/1996 | Belmont et al. .......... 106/20 R |
| 5,734,403 | A |   | 3/1998 | Suga et al. .................. 347/101 |
| 5,735,941 | A | * | 4/1998 | Feeman .................... 106/31.28 |
| 5,976,230 | A |   | 11/1999 | Askeland et al. ......... 106/31.27 |
| 6,062,674 | A | * | 5/2000 | Inui et al. ...................... 347/43 |
| 6,342,095 | B1 | * | 1/2002 | Takizawa et al. ........ 106/31.27 |

FOREIGN PATENT DOCUMENTS

| JP | 55-65269 | 5/1980 |
| JP | 6-171208 | 6/1994 |

* cited by examiner

Primary Examiner—Lamson Nguyen
(74) Attorney, Agent, or Firm—Fitzpatrick, Cella, Harper & Scinto

(57) ABSTRACT

A method of recording a multi-color image containing a plurality of image regions formed by applying an black ink and a color ink to overlap each other in different orders, where the black ink contains a salt, an aqueous medium and a pigment dispersed in the aqueous medium by the action of an ionic group, and the color ink contains a dye. Otherwise, the black ink contains a salt, an aqueous medium and a pigment dispersed in the aqueous medium by the action of an ionic group, and the color ink is reactive with the black ink. This method enables to obtain high quality images free from density unevenness or excellent in uniform feeling.

89 Claims, 18 Drawing Sheets

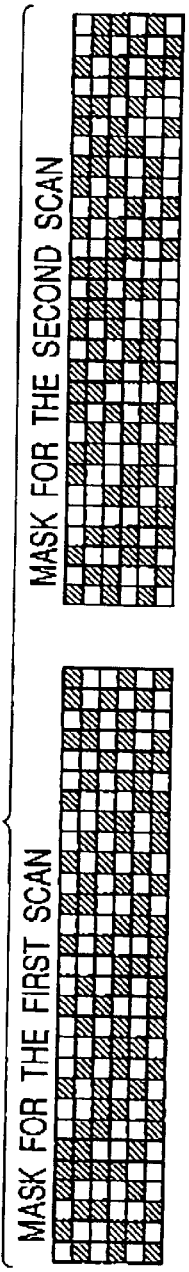
FIG. 21A  MASK FOR BLACK INK
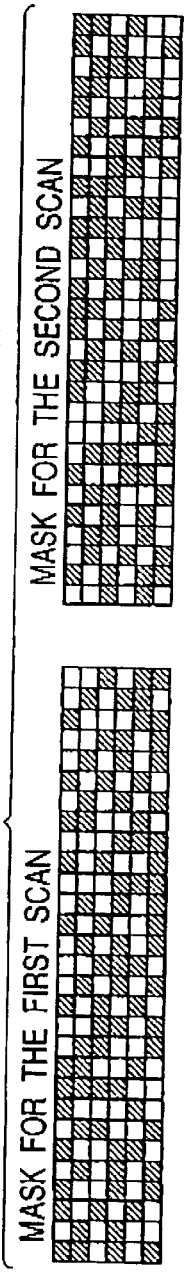
FIG. 21B  MASK FOR YELLOW INK
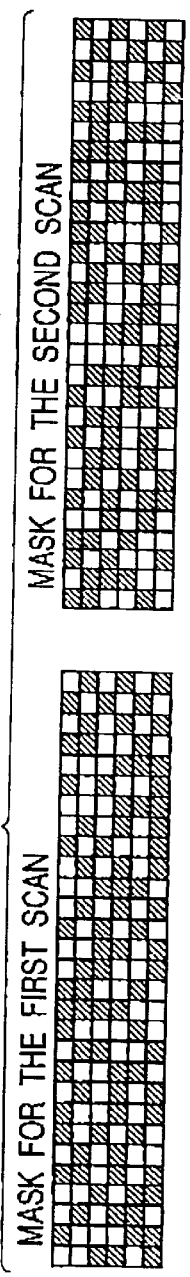
FIG. 21C  MASK FOR MAGENTA INK
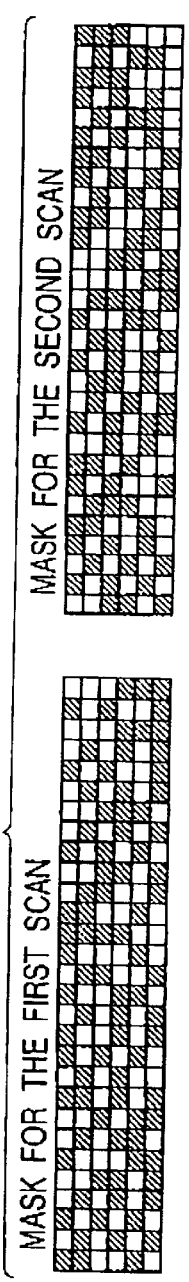
FIG. 21D  MASK FOR CYAN INK ID IMAGE RECORDING METHOD, METHOD
FOR IMPROVING QUALITY OF
MULTICOLOR IMAGE, IMAGE
RECORDING APPARATUS, INK SET,
RECORDING UNIT, IMAGE FORMING
METHOD, METHOD FOR IMPROVING
IMAGE QUALITY, AND METHOD FOR
FORMING MONOTONE IMAGE

BACKGROUND OF THE INVENTION

1. Field of the Invention

The present invention relates to an image recording method, a method for improving quality of multicolored images, an image recording apparatus, an ink set, a recording unit, an image forming method, a method for improving image quality, and a method for forming monotone image.

2. Related Background Art

An ink jet recording method is a method of low noise and no impact in which images are recorded by discharging ink directly onto a recording medium. With this method, reduction of running cost, down sizing of the recording apparatus and colorization of images can be easily achieved since this method does not require complicated apparatus. Accordingly, recording apparatuses such as recorders, copying machines, facsimiles and word processors employing this ink-jet recording method have been put into practice. Also, color ink jet recording apparatuses have been put into practice to form multicolor images by the above ink jet recording technology using black ink and at least one color ink selected from, for example, yellow ink, cyan ink, magenta ink, red ink, green ink and blue ink, so as to form multicolored images. In the color ink-jet recording, black ink is most often used, for example, for recording characters, so that sharpness, clearness and high optical density are required for recording with black ink. One known means to satisfy such requirements is to reduce the penetrability of black ink into the recording medium to control the penetration of the coloring material in the black ink into the recording medium.

On the other hand, when two different color inks are fed to a recording medium in a contiguous manner, they may be mixed at the boundary between them to deteriorate the quality of the color image. This phenomenon is called bleeding. To prevent bleeding, there is known a technique to increase the penetrability of color ink into recording media so that different color inks are prevented from mixing with each other on the surface of the recording medium (e.g., Japanese Patent Application Laid-Open No. 55-65269).

In the ink jet recording, to shorten the recording time, there have been proposed several processes; the both-way recording method in which recording is performed on both ways (backward and forward) in the principal scan direction (hereinafter referred to as "both-way recording") and the one-pass recording in which an image as wide as the recording head length is formed in one scan. The both-way recording can almost half the recording time on a sheet, since there is no idle carriage run returning to the home position without recording. The one-pass recording where an image is formed by one principal scan does not require multiple scanning on the same site of the recording medium, which can drastically reduce the recording time. There is also known a method to reduce the recording time by moving a carriage at a high speed.

To achieve high grade image, there is also a method called multi-pass recording method where an image of the same width as the length of the recording head is formed by more than one scanning in the principal scanning direction. Such a method can diminish the deviation inherent to each head. In this case, where an image is recorded dividing it into plural regions, a set of mask patterns as shown in the FIG. 19 are used for recording. In FIG. 19, the hatched region represents the recording region and non-hatched region represents non-recording region. The recording region is determined by computing the logical product of the recording region in the mask and the actual image region. It is known that unevenness due to each mask is diminished and images of higher quality can be obtained by using a different mask set for each ink, or using masks with offset for each ink.

It is also known that for the one-pass recording there is a method to achieve the same effect as in the multi-pass recording method by using more than one heads for the same ink. FIG. 20 is an example of heads for this method, where the heads 84 containing black ink are provided on either side of the color ink heads 81–83. In this case, the heads on both sides, which eject the same ink, are in a complementary relationship employing the masks as shown in FIG. 19.

SUMMARY OF THE INVENTION

After carrying out an investigation from various approaches so as to achieve shorter recording time and higher record quality by the both-way recording method or multi-pass recording or multi-head recording in the color ink-jet recording using black ink of low penetrability and color ink of high penetrability as described above, the present inventors have recognized the following technical problem. In the color ink-jet recording, black ink and color ink may be overlapped each other to achieve more smooth gradation. The present inventors have found that, when such recording is carried out by using an ink-jet recording apparatus capable of both-way recording as described above, or by using different masks for the color head and the black head in multi-pass recording, or by using an ink-jet recording apparatus having two or more heads containing the same ink, the reproduced color tone may vary depending on the recording order of the color ink and the black ink. That is, the reproduced color tone, which must be inherently the same, may vary depending on whether it was recorded by the head scanning in the forward direction or in the backward direction (hereinafter this phenomenon is referred to as "streakiness of both-way recording"). This streakiness of both-way recording is conspicuous where color ink and black ink were applied at a relatively large amount on the recording medium. Also, when different masks are used for a color head and a black head in multi-pass recording, or when the apparatus has two or more heads containing the same ink, image regions where the application order of black ink and color ink was different from the other region are present, which may lead to irregularity.

This phenomenon (irregularity due to the difference in application order of black ink and color ink) may considerably deteriorate images, in particular, of images in which black ink and color inks are intermingled. The present inventors have come to a conclusion that, in order to develop an ink jet recording apparatus capable of recording multi-color images of higher quality at a higher speed, thiS technical problem must be solved by all means.

Accordingly, one object of the present invention is to provide an image recording method which enables the recording of multi-color images of higher quality in a shorter period of time.

Another object of the present invention is to provide a method of improving the image quality of multi-color images which are produced using an ink jet recording apparatus.

Still another object of the present invention is to provide an image recording apparatus which can record multicolor images of higher quality at a high speed.

A further object of the present invention is to provide an ink set and a recording unit suitably used in an ink jet recording apparatus which enables recording of multicolor images of higher quality at a high speed.

The other object of the invention is to provide a method for obtaining images having visually uniform feeling.

Still the other object of the invention is to provide a method for improving the image grade to obtain images having uniform feeling using an ink-jet recording apparatus.

Still the other object of the present invention is a method for forming monotone image to obtain images expressed in more smooth monotone gradation.

According to one aspect of the present invention, there is provided a method of recording a multi-color image, wherein the multi-color image contains image regions formed by applying an black ink and a color ink to overlap each other in different orders, characterized in that the black ink contains a salt, an aqueous medium and a pigment dispersed in the aqueous medium by the action of an ionic group, and the color ink contains a dye.

According to one aspect of the present invention, there is provided a method of improving the image quality of an multi-color image by using an ink-jet recording head separately containing a black ink and a color ink, the multi-color image containing a plurality of image regions formed by applying an black ink and a color ink to overlap each other in different orders, characterized in that the black ink contains a salt, an aqueous medium and a pigment dispersed in the aqueous medium by the action of an ionic group, and the color ink contains a dye.

According to one aspect of the present invention, there is provided an image recording apparatus comprising:

(i) an ink jet recording head from which a black ink and a color ink are discharged separately at a recording medium; and (ii) means for carrying a recording medium to a position where the recording head carry out recording; characterized in that the black ink contains a salt, an aqueous medium and a pigment dispersed in the aqueous medium by the action of an ionic group, and the color ink contains a dye.

According to one aspect of the present invention, there is provided an ink set comprising a combination of a black ink and a color ink, the black ink containing a salt, an aqueous medium and a pigment dispersed in the aqueous medium by the action of an ionic group, the color ink containing a component which destabilizes the dispersion stability of the pigment of the black ink when the color ink and the black ink are mixed, the component being a dye, an additive, or a dye and an additive.

According to one aspect of the present invention, there is provided a recording unit comprising a black ink holding part which holds an black ink, a first ink jet head from which the black ink is discharged, a color ink holding part which holds a color ink and a second ink jet head from which the color ink is discharged, the black ink containing a salt, an aqueous medium and a pigment dispersed in the aqueous medium by the action of an ionic group, the color ink containing a component which destabilizes the dispersion stability of the pigment of the black ink when the color ink and the black ink are mixed, the component being a dye, an additive, or a dye and an additive.

According to one aspect of the present invention, there is provided an image forming method comprising the steps of:

(i) forming a first image region by applying a black ink to a recording medium, and (ii) forming a second image region by applying a black ink and a color ink to overlap each other onto the recording medium;

characterized in that the black ink comprises a salt, an aqueous medium, and a pigment dispersed in the aqueous medium by the action of an ionic group, and at least one color ink contains a dye or an additive or both, the dye and the additive destabilizing the dispersion stability of the pigment when mixed with the black ink.

According to one aspect of the present invention, there is provided a method for improving quality of a black image being formed by forming a first black image by applying a black ink to a recording medium, and forming a second black image by applying a black ink and a color ink to overlap each other onto the recording medium, characterized in that the black ink comprises a salt, an aqueous medium and a pigment dispersed in the aqueous medium by the action of an ionic group, and the color ink contains a dye or an additive or both where the dye and the additive destabilize the dispersion stability of the pigment when mixed with the black ink.

According to one aspect of the present invention, there is provided a method for forming a monotone image characterized in that an ink set above mentioned is used.

By employing the above mentioned various constitutions, it is possible to greatly improve the density unevenness in both-way recording which may be observed when, for example, recording of multicolor images is carried out at a high speed recording not only in the outward head scan direction but also in homeward direction. In one-pass both-way recording, it is also possible to obtain an excellent image of which optical density would not vary according to the recording directions. Further, it is possible to suppress the poor uniform feeling of the image formed by the multi-pass recording, which may occur due to the presence of sites where the application order of color ink and black ink is different, to obtain good images.

As a more preferable aspect of the present invention, there is a recording method using color ink containing a dye or an additive or both which destabilizes the dispersion stability of the pigment in black ink when mixed with the black ink. Such a configuration can effectively improve the streakiness of both-way recording or uniform feeling of images recorded by the multi-pass recording.

BRIEF DESCRIPTION OF THE DRAWINGS

FIGS. 21A, 21B, 21C and 21D illustrate mask sets for applying black ink, yellow ink, magenta ink, and cyan ink used in Experiment 3 respectively.

FIG. 23A: Control ink set

FIG. 23B: Control ink set (applied ink amounts are small)

FIG. 23C: Control ink set (applied ink amounts are large)

FIG. 23D: Ink set according to the first aspect of the invention

FIG. 23E: Ink set according to (1) of the second aspect of the invention

FIG. 23F: Ink set according to (2) of the second aspect of the invention

DETAILED DESCRIPTION OF THE PREFERRED ASPECTS

The present invention is explained in detail describing various aspects thereof.

The first aspect of the present invention is a recording method to form images by applying a black ink and a color ink at an image forming site on a recording medium to overlap each other but in varying order, wherein the black ink contains a salt, an aqueous medium and a pigment dispersed in the aqueous medium by the action of ionic groups, and the color ink contains a dye as a coloring material.

According to this aspect, the effect of the application order of the color ink and black ink on the evenness of the image is diminished. The precise mechanism of such a phenomenon is not clear, but the inventors of the present invention think that the image unevenness may be caused by the different penetrability of black ink and color ink, on the basis of intensive study of the above mentioned technical problems and objects. That is, for example, when the ink application order is black ink and then color ink during forward scanning of the head in both-way recording, the application order during backward scanning is color ink and then black ink, and the penetration degree of the coloring materials may vary according to the application order of the inks, resulting in the so-called unevenness in both-way recording. This is explained by comparing an ink set of the present invention with an ink set comprised of a black ink containing a pigment as the coloring material but no salt and a color ink containing a dye as the coloring material (hereinafter called "control ink set"), referring to FIGS. 11A to 11E, 22, and 23A to 23F.

Figure 22:
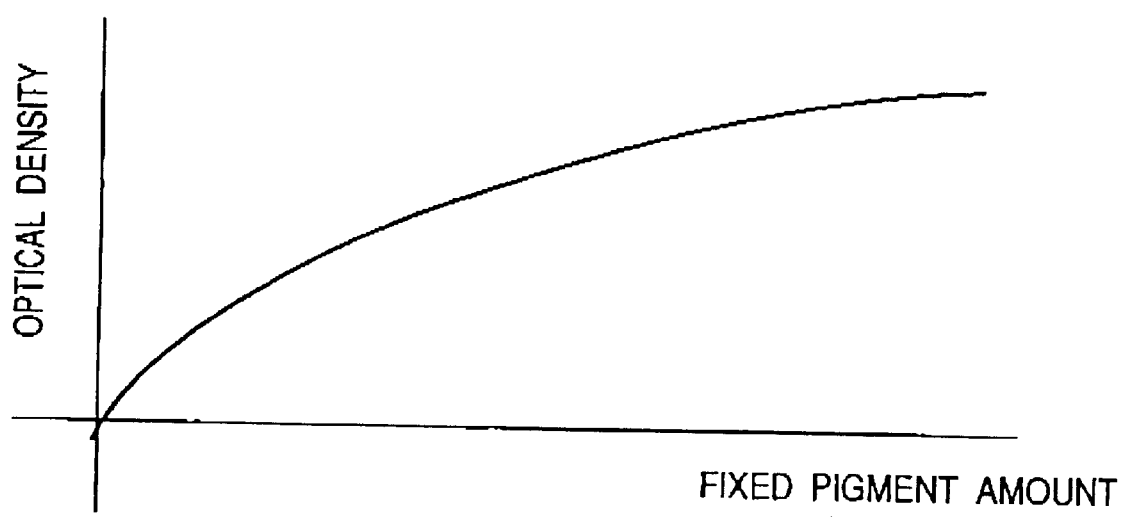
FIG. 22 schematically illustrates the relationship between the amount of the pigment fixed in the upper part of the recording medium and the optical density of image formed thereby.

First, optical density of the image and the amount of the pigment on the recording medium are explained. When a conventional black ink is applied onto the recording medium, the pigment coloring material fixed on and near the surface (hereinafter referred to as "upper part") of the recording medium dominantly contributes to the reflective optical density of the formed image. Usually, the relationship between the amount of the pigment fixed in the upper part of the recording medium and the optical density is represented by a saturation curve as shown in FIG. 22.

<Behavior of Coloring Materials of Control Ink Set>

Figure 23A:
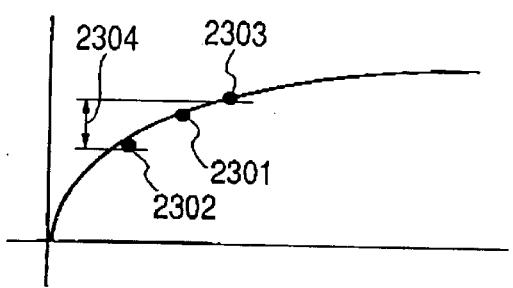
FIGS. 23A, 23B, 23C, 23D, 23E and 23F are graphs to compare the optical density of images formed with: black ink only, black ink and color ink applied in this order, and color ink and black ink applied in this order.

Behavior of coloring materials on the recording medium is explained when the control ink set is used for recording. When only the black ink of the control ink set is ejected, the point 2301 in the curve in FIG. 23A represents the amount of the pigment set in the upper part of the recording medium and the optical density. Since an ink of low penetrability is usually used as black ink, the amount of the pigment set in the upper part of the recording medium is relatively large. When the color ink of the control ink set is applied to the recording medium before the black ink as shown in FIG. 11F, black ink 1101 is applied onto the recording medium 1103 where the color ink 1105 has already been applied and the recording medium has become wettable (permeable). Thus, the coloring material of the black ink readily penetrates into the recording medium as shown in FIG. 11G, leading to the reduction in the optical density. In this case, there is no problem in uniform feeling of the image since the black ink penetrates after the color ink has penetrated uniformly.

Figure 11A:
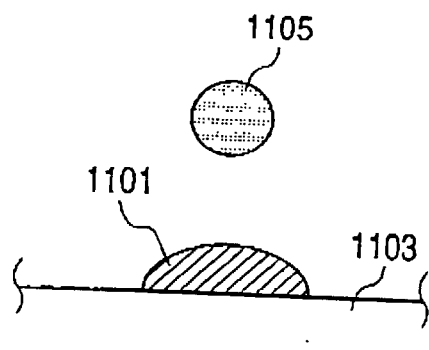
FIGS. 11A, 11B, 11C, 11D, 11E, 11F and 11G illustrate the behavior of the coloring materials when a pigment ink containing no salt and a color ink are applied onto a recording medium. in this order.
Figure 11E:
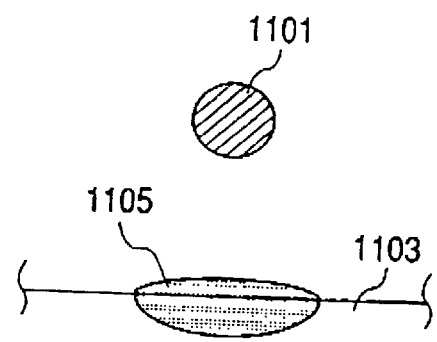
Figure 11B:
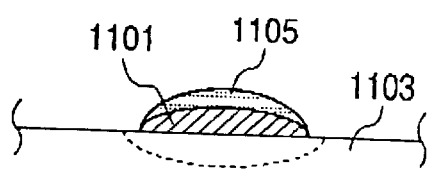
Figure 11F:
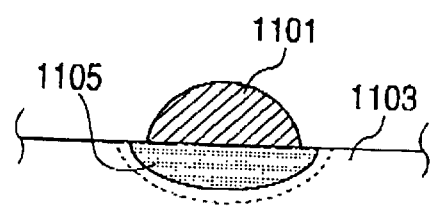
Figure 11C:
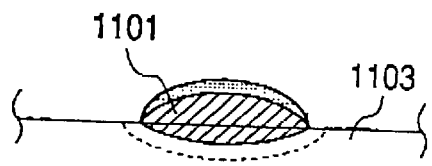
Figure 11G:
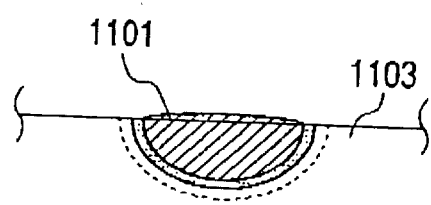
Figure 11D:
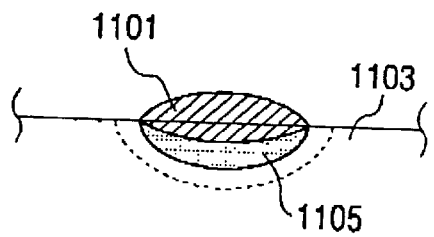

Next, when the black ink is applied prior to the color ink application, the black ink 1101 of low penetrability covers the recording medium 1103 as shown in FIG. 11A and slowly penetrates into the recording medium 1103. After that, the color ink 1105 of high penetrability is applied, but the penetration speed of the black ink will not change much, since the surface of the recording medium is covered with the black ink as shown FIGS. 11B and 11C. Under such circumstances, the penetration of the black ink into the recording medium is slow, thus the coloring material of the black ink tends to remain on the surface of the recording medium to give a recorded image of high optical density. When a large amount of the color ink is applied, an image of poor uniform feeling might be formed because of poor mixing of color ink and black ink on the recording medium, and it is considered that the color ink 1105 will penetrate into the recording medium as shown in FIG. 11D, passing through the aggregates of the pigment on the surface of the recording medium.

The mechanism how the optical density varies when the application order is reversed is then explained referring to the optical density-pigment/coloring material curve. In FIG. 23A, the point 2301 represents the relationship between the amount of the pigment present in the upper part of the recording medium and the optical density of the image formed solely with the black ink of the control ink set. As mentioned above, the amount of the pigment set in the upper part of the recording medium is relatively large. The point 2302 represents the amount of the pigment present in the upper part of the recording medium and the optical density of the formed image when the black ink of the control ink set was applied to the recording medium after the application of the color ink. In this case, the black ink penetrates into the recording medium as shown in FIGS. 11E to 11G, so that the amount of the pigment in the upper part of the recording medium decreases to give low optical density, and the dye contained in the color ink will not contribute much to the optical density because of the high penetrability of the color ink. Next, the point 2303 represents the amount of the pigment present in the upper part of the recording medium and the optical density of the formed image when the black ink was applied to the recording medium followed by the application of the color ink. In this case, the pigment slowly penetrates into the recording medium due to the slow penetration speed of the black ink 1101 as shown in FIGS. 11A to 11D. As a result, the amount set in the upper part of the recording medium would not vary much from the pigment amount fixed when only the black ink was applied for recording. Strictly speaking, the optical density becomes slightly higher than that with the black ink only presumably according to the partial superimpose of the dye in the color ink 1105 onto the black pigment fixed in the upper part of the recording medium. However, as the dye concentration in the color ink is not so high that the difference in the optical density between 2303 and 2301 is visually indistinguishable. On the other hand, there is a great difference in optical density between 2302 and 2303, where the difference is indicated as 2304, showing that the difference in optical density will occur according to the application order of black ink and color ink.

Figure 23D:
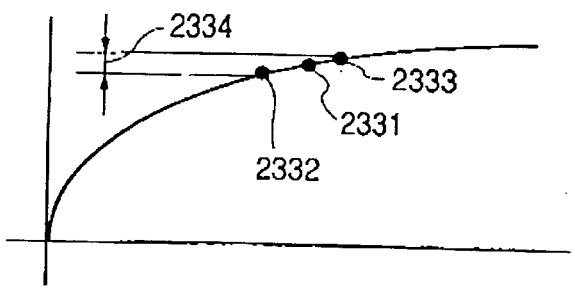
Figure 23B:
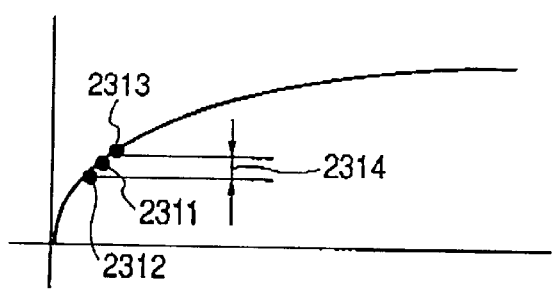

In addition, occurrence of this phenomenon depends on the application amounts of the color ink and the black ink to the recording medium. FIG. 23B shows the change of the optical density when the application amounts of the black ink and the color ink are small. In this case, the influence of the high penetrability of the color ink would hardly affect the penetrability of the black ink into the recording medium, because of the small application amount of the color ink. Therefore, when the black ink is applied after the color ink application, the amount of the fixed pigment in the upper part of the recording medium (point 2312) is almost the same as that of single application of the black ink (point 2311). Also, when the black ink was applied prior to the color ink application, the amount of the pigment fixed in the upper part of the recording medium is hardly affected, and the amount of the dye superimposed on the fixed pigment is small, so that the optical density is hardly increased (point 2313), that is, the difference in the optical density 2314 between the point 2312 and the point 2313 would not become large. Further, as each of the color ink and the black ink are present in a small amount, no deterioration in the uniform feeling of the image is observed.

Figure 23E:
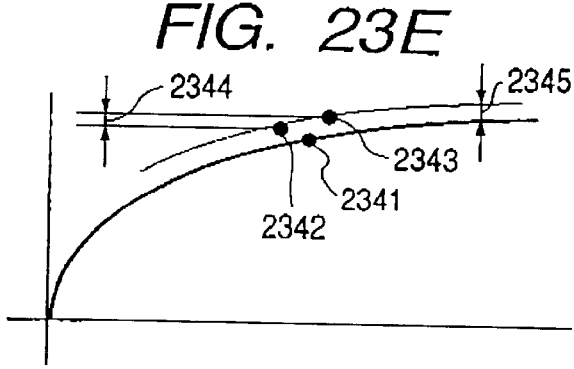
Figure 23C:
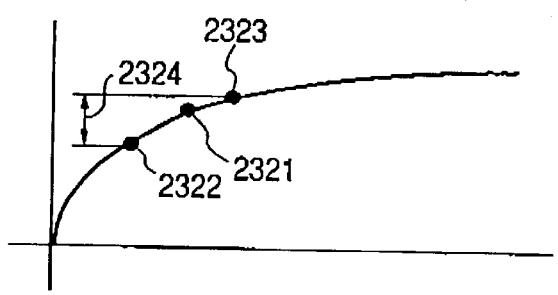

When the black ink and the color ink are applied in a large amount as shown in FIG. 23C, there is observed a large difference in the optical density between the point 2322 where the black ink is applied after the color ink application and the point 2321 where only the black ink is applied, although the optical density at the point 2323 where the black ink is applied prior to the color ink is slightly higher than the point 2321 of the black ink only, thus a large difference (2324) is present in the optical density according to the application order.

<Presence of Salt of Non-reactive Type>

Here we will see the case when an ink set according to the first aspect of the present invention is used, in comparison with the phenomena with the control ink set.

First explained is the difference in the penetration manner of the ink, according to whether the ink contains a salt or not, when applied to the recording medium.

Figure 9A:
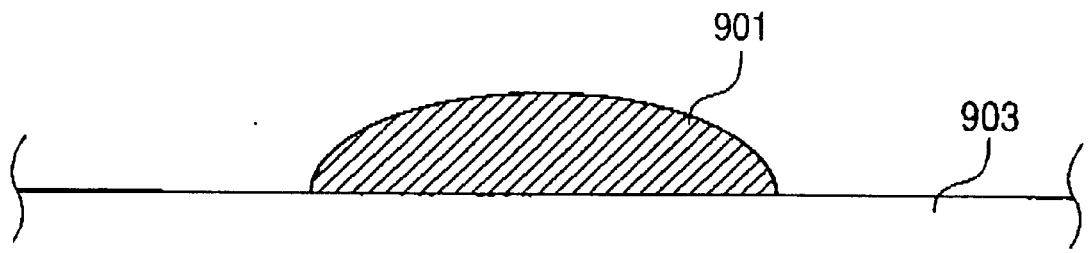
FIGS. 9A, 9B and 9C illustrate a course of solid-liquid separation when a pigment ink containing a salt is applied to a recording medium.
Figure 9B:
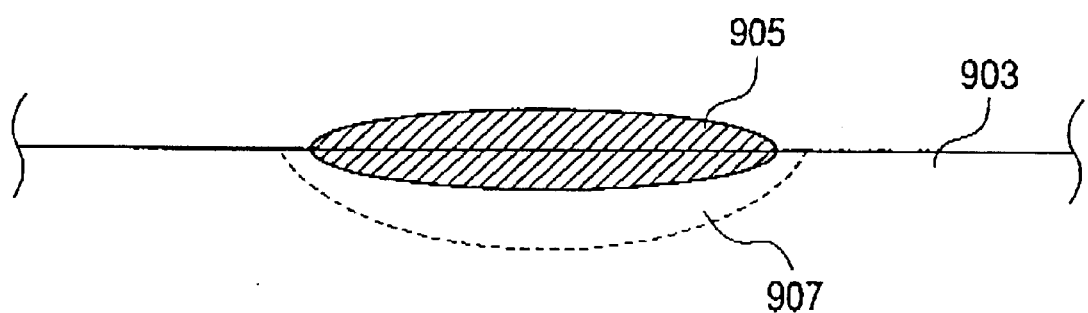
Figure 9C:
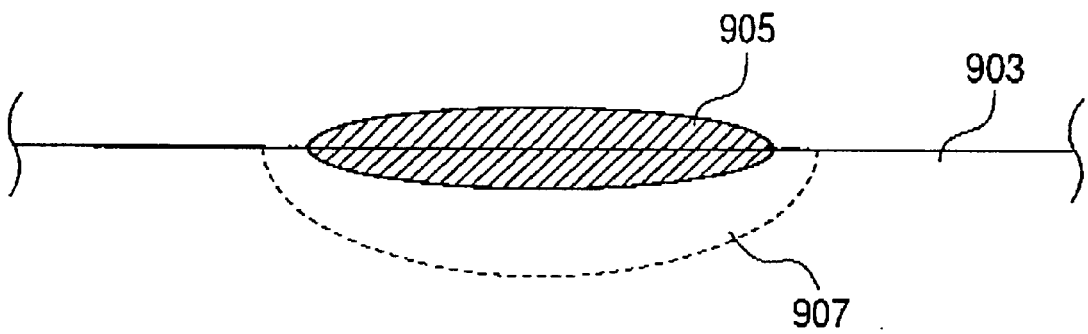
Figure 10A:
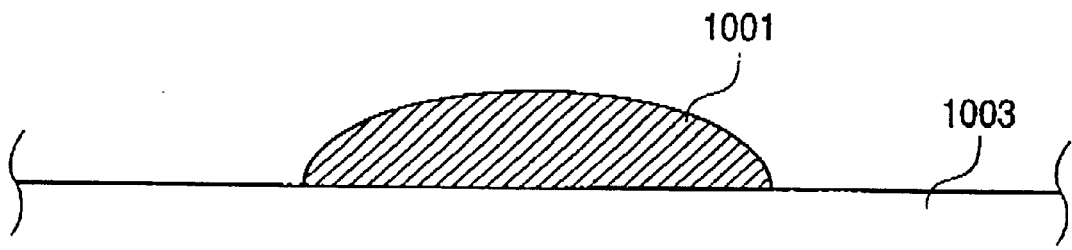
FIGS. 10A, 10B and 10C illustrate a course of solid-liquid separation when a pigment ink containing no salt is applied to a recording medium.
Figure 10B:
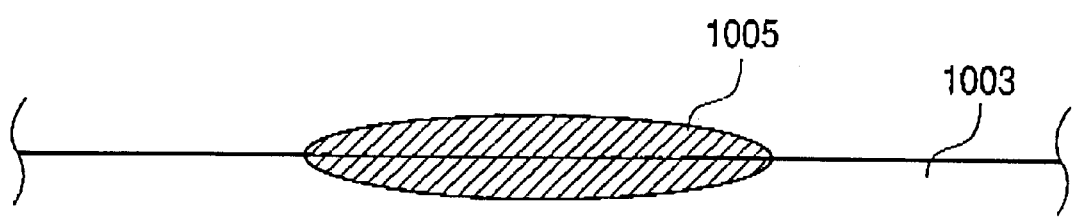
Figure 10C:
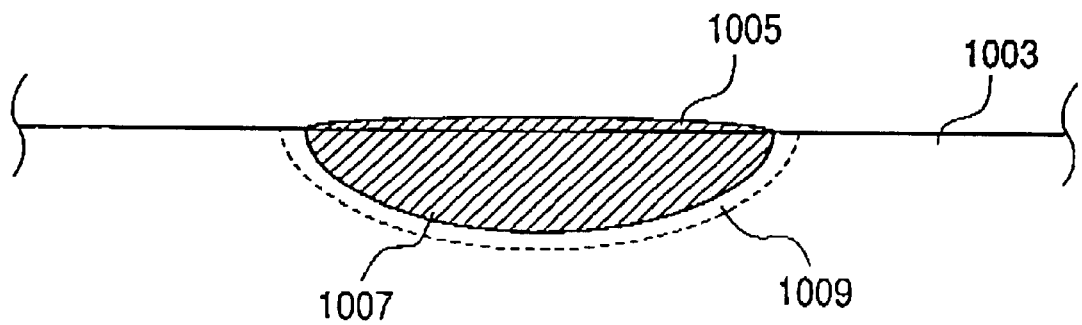

FIGS. 9A to 9C and FIGS. 10A to 10C schematically and conceptually illustrate how solid-liquid separation occurs when an ink containing a salt (pigment ink 901) or one not containing any salt (pigment ink 1001) is ejected from the orifice by the ink-jet recording method to attach onto a recording medium of high permeability. Namely, immediately after the landing of the ink droplet onto the recording medium, the pigment ink 901 and 1001 both remain on the surface of the recording medium 903 and 1003 respectively, regardless of the presence of a salt, as shown in FIG. 9A and FIG. 10A. After the lapse of time (T1), solid-liquid separation rapidly occurs in the ink 901, and the solvent of the ink separates from the area 905 containing almost all of the solid components of the ink, and penetrates into the recording medium 903 with the solvent front 907 as shown in FIG. 9B. On the other hand, as the solid-liquid separation of the salt-free ink would not occur as rapid as the salt-containing ink, the salt-free pigment ink penetrates into the recording medium 1003 in an unseparated state 1005 as shown in FIG. 10B. After the lapse of time (T2), with the salt-containing ink 901, the solvent front 907 further goes down into the recording medium but the area 905 remains at and near the surface of the recording medium as shown in FIG. 9C. While, with the salt-free ink 1001, solid-liquid separation just occurs at this point of time as shown in FIG. 10C, and the front (1007) of the solid-containing region and the solvent front 1009 begin to separate, but the solid-containing region 1005 has migrated deep into the recording medium.

Here, T1 and T2 are the landmarks to conceptually understand the difference of the solid-liquid separation due to the presence or absence of salt in the ink. As clearly seen from the above explanation, the addition of a salt causes rapid solid-liquid separation, thus solid-liquid separation occurs at a relatively earlier stage after the landing of the ink droplet and the solvent penetrates into the recording paper, which results in the above mentioned effects. Namely, it is considered that the addition of a salt makes the image quality insusceptible to the permeability of the recording medium. Among the salts mentioned above, sulfates such as potassium sulfate, and benzoates such as ammonium benzoate can give high quality ink-jet images on various recording media, presumably because they have good affinity to the self-dispersible carbon black resulting in excellent solid-liquid separation effect when given to a recording medium.

As explained above, when the black ink according to this aspect is applied to the recording medium by itself, since the black ink has low penetrability and solid-liquid separation occurs rapidly due to the salt effect, the concentration of the pigment set into the upper part of the recording medium is very high to bring about the optical density higher than that with the black ink in the control ink set.

Figure 12A:
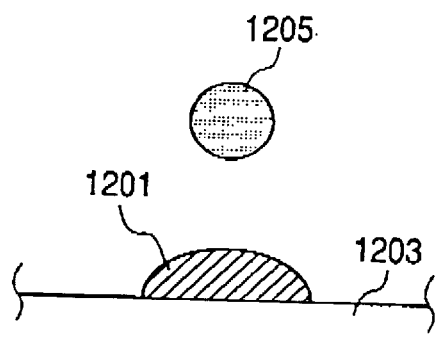
FIGS. 12A, 12B, 12C, 12D, 12E, 12F and 12G illustrate the behavior of the coloring materials when a pigment ink containing a salt and a color ink are applied onto a recording medium.
Figure 12E:
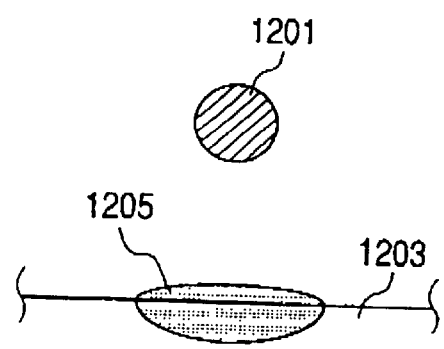
Figure 12B:
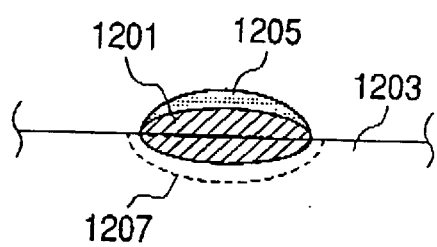
Figure 12F:
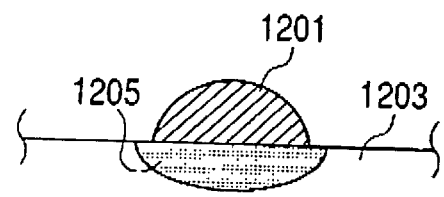
Figure 12C:
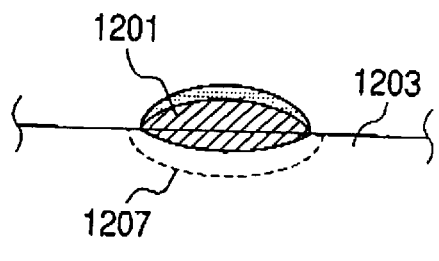
Figure 12G:
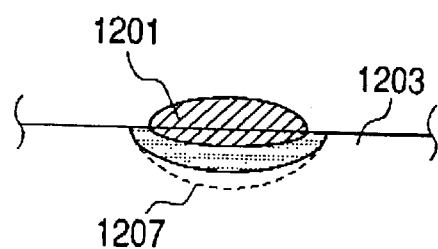

Next, FIGS. 12E to 12G illustrate the situation when an ink set according to the present invention is applied onto the recording medium in an order of color ink and then black ink. Since the black ink 1201 is applied onto the recording medium 1203 of which permeability has increased because of the firstly applied color ink 1205, the penetration speed of the black ink into the recording medium is increased, but due to the salt present in the black ink the solid-liquid separation of the black ink occurs faster than the ink penetration into the recording medium, solidification of the coloring material in the ink occurs rapidly, penetration of the coloring material in the black ink is inhibited as shown in FIG. 12G. As a result, a recorded matter of high optical density can be obtained. In FIGS. 12B to 12G, 1207 represents the moving front of the aqueous solvent in the ink.

Figure 12D:
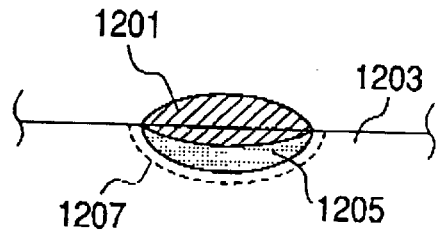

FIGS. 12A to 12D illustrate the situation when black ink is applied prior to the color ink application. The black ink of low penetrability covers the recording medium 1203 as shown in FIG. 12A and slowly penetrates into the recording medium 1203, and the pigment in the black ink rapidly form aggregates by the action of the salt on the surface of the recording medium. After that, color ink 1205 of high penetrability is applied, but the penetration speed of the black ink will not change much, since the surface of the recording medium is covered with the rapidly aggregating black ink as shown FIG. 12C. As a result, the pigment in the black ink tends to remain on the surface of the recording medium 1203 as shown in FIG. 12D to give a recorded image of high optical density. Even when a large amount of the color ink is applied, solid matter of the black ink sufficiently remains on the recording medium due to the solid-liquid separation to give good uniform feeling to the image. Although the dye in the color ink partly sets on the pigment of the black ink fixed on the recording medium, usually the dye concentration in the ink-jet ink is not so high as to contribute to the Visual image density. When the dye concentration in the color ink is 10% by weight or less based on the total weight of the color ink, contribution of the dye on the fixed pigment to the image density is negligible.

The reason why the difference in image density due to the application order of the black and color inks is suppressed when the black ink contains a salt, is as mentioned above. In FIG. 23D, the point 2331 represents the amount of the pigment present in the upper part of the recording medium and the obtained optical density, when the black ink alone was applied onto the recording medium. In this case, the optical density is high because of the presence of salt. When the color ink was applied prior to the black ink, the amount of the fixed black ink decreases slightly since the color ink has increased the permeability of the recording medium, as shown by the point 2332. However, due to the solid-liquid separation of the black ink, the penetration of the black ink pigment into the recording medium is suppressed, and a large amount of the pigment is held in the upper part of the recording medium. When the black ink is applied to the recording medium prior to the color ink, the penetrability of the black ink was hardly affected, so that a sufficient amount of the pigment is fixed in the upper part of the recording medium (point 2333). In either order, almost all dye diffuses into the recording medium because of the high penetrability of the color ink, hardly contributing to the image density. By such a mechanism, difference in the image density due to the application order of the color ink and the black ink (2334) can be suppressed effectively, since both cases can give high image density.

Next, the ink constitution, recording method, and recording apparatus according to the first aspect of the present invention are described.

The ink-jet recording method according to one aspect of the present invention is a method to record full color images by using an ink jet recording head separately containing black ink and color ink, where the full color images includes those formed by superimposing the black ink and color ink each other in different order; the black ink comprises a salt, an aqueous medium, and a pigment coloring material dispersed in the aqueous medium by the action of the ionic groups; and the color ink contains at least one coloring material selected from cyan, magenta, yellow, red, green and blue coloring materials.

<Black Ink>

Suitable coloring material for the black ink is carbon black. Concerning the dispersion state in the ink, the carbon black may be of self-dispersible type or it may be dispersed with a dispersant in the ink.

<Self-dispersible Carbon Black>

As the self-dispersible carbon black, there are carbon blacks having at least one kind of hydrophilic (anionic or cationic) group bonded directly or via other atomic groups to the surface as the ionic group. Use of self-dispersible carbon black dispenses with a dispersant to disperse carbon black particles.

As carbon blacks having an anionic group bonded onto the surface directly or via an atomic group, there are those having a hydrophilic group such as $-COO(M2)$, $-SO_3(M2)$, $-PO_3H(M2)$ and $-PO_3(M2)_2$.

In the formulae mentioned above, M2 represents a hydrogen atom, an alkali metal, ammonium or an organo-ammonium. Among these, especially preferable for the present invention are carbon blacks anionically charged by having $-COO(M2)$ or $-SO_3(M2)$ on the surface thereof, because of high dispersibility. Specific examples of alkali metals for M2 include Li, Na, K, Rb, Cs and the like, and organo-ammonium include methyl ammonium, dimethyl ammonium, trimethyl ammonium, ethyl ammonium, diethyl ammonium, triethyl ammonium, methanol ammonium, dimethanol ammonium, trimethanol ammonium and the like. Ink according to this aspect which contains a self-dispersible carbon black of which M2 is ammonium or organo-ammonium can improve the water fastness of recorded images and thus especially preferable. This is because the ammonium salt will decompose and evaporate when the ink is applied on the recording medium. The self-dispersible carbon black of which M2 is ammonium can be prepared by treating a self-dispersible carbon black in which M2 is an alkali metal by the ion exchange method to replace the alkali metal with ammonium, or by first converting it to the H-type (free acid type) with an acid and then adding ammonium hydroxide to change M2 to ammonium.

As a method for manufacturing anionically charged self-dispersible carbon black, there is the oxidation treatment of carbon black with sodium hypochlorite to chemically bond —COONa group to the surface of carbon black.

As cationically charged carbon black, those having at least one selected from the quaternary ammonium groups shown below bonded onto the surface of carbon black can be used:

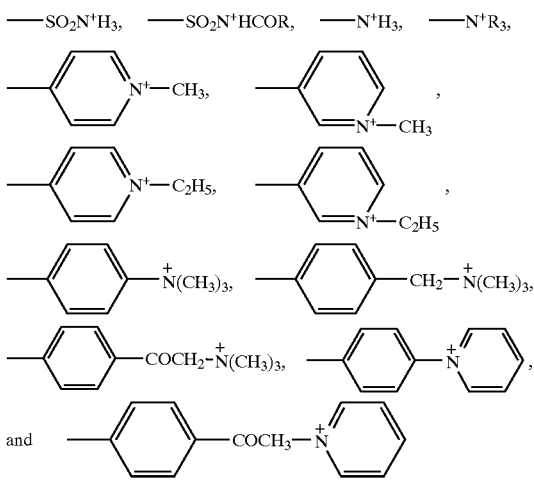

wherein R represents a straight or branched alkyl group having 1 to 12 carbon atoms, a substituted or unsubstituted phenyl group or a substituted or unsubstituted naphthyl group.

Aforementioned cationic groups have counter anions such as $NO_3^-$ and $CH_3COO^{31}$.

A preparation method of a cationically charged self-dispersible carbon black due to its hydrophilic group is explained with a method to introduce to carbon black an N-ethylpyridyl group:

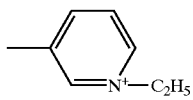

by treating carbon black with 3-amino-N-ethyl pyridinium bromide. Because of excellent water dispersibility due to the repulsion of ions, the anionically or cationically charged carbon black due to the hydrophilic group introduced onto the surface thereof retains a stable dispersion state without addition of a dispersant even in an aqueous ink.

Meanwhile, various hydrophilic groups as mentioned above may be bonded directly to the surface of black carbon, or may be indirectly bonded via an atomic group laid between the surface and the hydrophilic group. Here, specific examples of such an atomic group include straight or branched alkylene groups having 1 to 12 carbon atoms, substituted or unsubstituted phenylene groups and substituted or unsubstituted naphthylene groups. As the substituents for the phenylene groups and naphthylene groups, there are straight or branched alkyl groups having 1 to 6 carbon atoms. Specific examples of combinations of the atomic group and the hydrophilic group include —$C_2H_4$—COOM, —Ph—$SO_3$M and Ph—COOM, where Ph represents a phenyl group and M an alkaline metal.

In this aspect, one or more kinds of self-dispersible carbon black selected from the above types may be used as the coloring material of the ink. The content of a self-dispersible carbon black is preferably in the range of from 0.1 to 15% by weight, more specifically, from 1 to 10% by weight to the total weight of ink. Within this range, the self-dispersible carbon black can retain a sufficient dispersion state in the ink. Furthermore, in order to adjust the color tone of the ink, one or more dyes may be added to the ink as the coloring material in addition to the self-dispersible carbon black.

<Ordinary Carbon Black>

It is also possible to use ordinary carbon black, instead of the self-dispersible carbon black. For example, carbon black pigments such as furnace black, lamp black, acetylene black, and channel black may be used. Those carbon black pigments include Raven 7000, Raven 5750, Raven 5250, Raven 5000, Raven 3500, Raven 2000, Raven 1500, Raven 1250, Raven 1200, Raven 1190ULTRA-11, Raven 1170, Raven 1255 (Up to this point Columbia products), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (Up to this point Cabot products), Color Black FW1, Color Black FW2, Color Black FW2V, Color Black FW18, Color Black FW200, Color Black S150, Color Black S160, Color Black S170, Recordex 35, Recordex U, Recordex V, Recordex 140U, Recordex 140V, Special Black 6, Special Black 5, Special Black 4A, Special Black 4 (Up to this point Degusa products), No. 25, No. 33, No. 40, No. 47, No. 52, No. 900, No. 2300, MCF-88, MA 600, MA 7, MA 8, and MA 100 (Up to this point Mitsubishi Chemical products). Known carbon black also may be used without being limited to the above carbon blacks. Furthermore, fine particles of magnetic material such as ferrite, and titanium black may be used as a black pigment.

When those normal carbon blacks are used as a coloring material for black ink, preferably a dispersant is added in ink to disperse them stably in aqueous medium. A dispersant which is preferably used has an ionic group which functions to disperse carbon black stably in aqueous medium. The above described dispersants include styrene-acrylic acid copolymer, styrene-acrylic acid-alkyl acrylate copolymer, styrene-maleic acid copolymer, styrene-maleic acid-alkyl acrylate copolymer, styrene-methacrylic acid copolymer, styrene-methacrylic acid-alkyl acrylate copolymer, styrene-maleic acid halfester copolymer, vinylnaphthalene-acrylic acid copolymer, vinylnaphthalene-maleic acid copolymer, and styrene-maleic anhydride-maleic acid halfester copolymer, or their salts. Of all copolymers described above those having a weight average molecular weight in the range of 1,000 to 30,000 are preferred, more preferably in the range of 3,000 to 15,000.

<Salt Contained in the Black Ink>

As the salt contained in the ink according to this aspect, it is preferable to use at least one selected from the group consisting of $(M1)_2SO_4$, $CH_3COO(M1)$, Ph—COO(M1), $(M1)NO_3$, (M1)Cl, (M1)Br, (M1)I, $(M1)_2SO_3$ and $(M1)_2CO_3$. Here, M1 is an alkali metal, ammonium or an organo-ammonium and Ph means a phenyl group. As the specific examples of the alkali metal, there are Li, Na, K, Rb, and Cs, and as the specific examples of organo-ammonium, there are methyl ammonium, dimethyl ammonium, trimethyl ammonium, ethyl ammonium, diethyl ammonium, triethyl ammonium, trimethanol ammonium, dimethanol ammonium, trimethanol ammonium, ethanol ammonium, diethanol ammonium and triethanol ammonium.

By adding the above mentioned salt in an ink in which a coloring material is dispersed in the aqueous medium by the action of the ionic groups (e.g., an ink containing self-dispersible carbon black), it is possible to obtain an ink which can form images of high quality which would not vary with the type of the recording medium. At present, the precise mechanism how the ink according to this aspect displays such effects is not clear. However, the present inventors have found that such an ink shows a larger Ka value in comparison with the ink of the same composition except for not containing any salt. Ka value is determined by the Bristow method, and known as a measure indicating the penetrability of the ink into a recording medium. Conventionally, it is thought in the art that the increase of Ka value means the increase in penetrability of the ink into a recording medium and the increase in penetrability of the ink means the decrease of image density. Namely, it is a common knowledge for those skilled in the art that the coloring material penetrates into the recording medium as the ink penetrates, which leads to low image density. However, when various findings with the ink of the invention are comprehensively considered, the salt seems to cause rapid separation of the solid components from the solvent (solid-liquid separation) in the ink of the invention on the surface of the recording medium. In other words, if the solid-liquid separation in the ink on the recording medium is slow, when an ink having a large Ka value or a recording medium of high permeability is used, the ink will diffuse isotopically into the recording medium together with the coloring material, which will lead to poor sharpness of recorded characters (poor character quality) and at the same time the coloring material penetrates deep into the recording medium to cause low image density. Since such phenomena are not observed with the ink of the invention, presumably, solid-liquid separation rapidly occurs on the recording medium, resulting in high quality image formation in spite of the increased Ka value of the ink. The same can be said for the reason why phenomena such as poor character quality and low image density would hardly occur when a recording medium of relatively high permeability is used with the ink of the invention. Next, this point will be explained referring to FIGS. 9A to 9C and FIGS. 10A to 10C.

FIGS. 9A to 9C and FIGS. 10A to 10C schematically and conceptually illustrate the manner of solid-liquid separation which occurs when an ink containing a salt (pigment ink 901) or one not containing any salt (pigment ink 1001) is ejected from the orifice by the ink-jet recording method to attach onto a recording medium of high permeability. Namely, immediately after the landing of an ink droplet onto the recording medium, the pigment ink 901 and 1001 both remain on the surface of the recording medium 1103 and 1203 respectively, regardless of the presence of a salt, as shown in FIG. 9A and FIG. 10A. After the lapse of time (T1), solid-liquid separation rapidly occurs in the ink 901, and the solvent of the ink separates from the area 905 containing almost all of the solid components of the ink, and penetrates into the recording medium 903 with the solvent front 907 as shown in FIG. 9B. On the other hand, as the solid-liquid separation of the salt-free ink would not occur as rapid as the salt-containing ink, the salt-free pigment ink penetrates into the recording medium 1003 in an unseparated state 1005 as shown in FIG. 10B. After the lapse of time (T2), with the salt-containing ink 901, the solvent front 907 further goes down into the recording medium but the area 905 remains at and near the surface of the recording medium as shown in FIG. 9C. While, with the salt-free ink 1001, solid-liquid separation just occurs at this point of time as shown in FIG. 10C, and the front (1007) of the solid-containing region and the solvent front 1009 begin to separate, but the solid-containing region 1005 has migrated deep into the recording medium. Here, T1 and T2 are the landmarks to conceptually understand the difference of the solid-liquid separation due to the presence or absence of salt in the ink. As clearly seen from the above explanation, the addition of a salt causes rapid solid-liquid separation, thus solid-liquid separation occurs at a relatively earlier stage after the landing of the ink droplet and the solvent penetrates into the recording paper, which results in the above mentioned effects. Namely, it is considered that the addition of a salt makes the image quality insusceptible to the permeability of the recording medium. Among the salts mentioned above, sulfates such as potassium sulfate, and benzoates such as ammonium benzoate can give high quality ink-jet images on various recording media, presumably because they have good affinity to the self-dispersible carbon black, specifically they are excellent in solid-liquid separation effect when given to a recording medium.

The content of the self-dispersible carbon black in the ink is preferably in the range of from 0.1 to 15% by weight, especially from 1 to 10%, to the total weight of the ink, while the salt content is preferably in the range of from 0.05 to 10% by weight, especially from 0.1 to 5% by weight. By setting the contents of the self-dispersible carbon black and the salt to the above mentioned ranges, a superior effect can be obtained.

<Aqueous Medium in Black Ink>

The aqueous medium of the black ink of the present invention may be water or a mixture of water and a water-soluble organic solvent, where especially preferable water-soluble organic solvents are those that can prevent drying of the ink. Specific examples include $C_1$–$C_4$ alkyl alcohols such as methyl alcohol, ethyl alcohol, n-propyl alcohol, iso-propyl alcohol, n-butyl alcohol, sec-butyl alcohol, and tert-butyl alcohol; amides such as dimethyl formaldehyde and dimethyl acetamide; ketones or ketoalcohols such as acetone and diacetone alcohol; ethers such as tetrahydrofurane and dioxane; polyalkylene glycols such as polyethylene glycol and polypropylene glycol; alkylene glycols with a $C_2$–$C_6$-alkylene group such as ethylene glycol, propylene glycol, butylene glycol, triethylene glycol, 1,2,6-hexane triol, thio-diglycol; hexylene glycol and diethylene glycol; lower alkyl ether acetates such as polyethylene glycol monomethylether acetate; glycerol; lower alkyl ethers of polyhydric alcohols such as ethylene glycol monomethyl- (or monoethyl-)ether, diethylene glycol methyl- (or ethyl-) ether and triethylene glycol monomethyl- (or monoethyl-)ether; polyhydric alcohols such as trimethylol propane and trimethylol ethane; N-methyl-2-pyrrolidone, 2-pyrrolidone and 1,3-dimethyl-2-imidazolidinone. Such water-soluble organic solvents may be used singly or as a mixture. It is desirable to use deionized water.

The content of the water-soluble organic solvent in the ink according to the first aspect of the invention is not especially limited, but preferably lies within the range of from 3 to 50% by weight on the basis of the total weight of the ink. The content of water in the ink preferably lies within the range of from 50 to 95% by weight.

Figure 18:
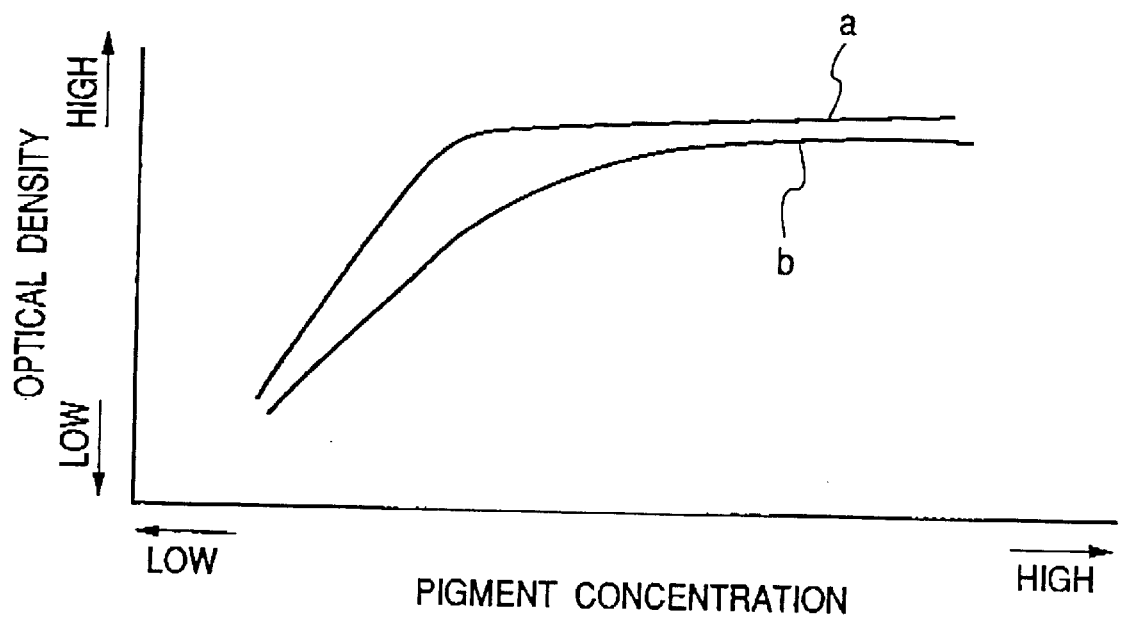
FIG. 18 is a graph showing the relationship between the pigment concentration in ink containing or not containing a salt and the optical density of images formed with the ink.
Figure 19:
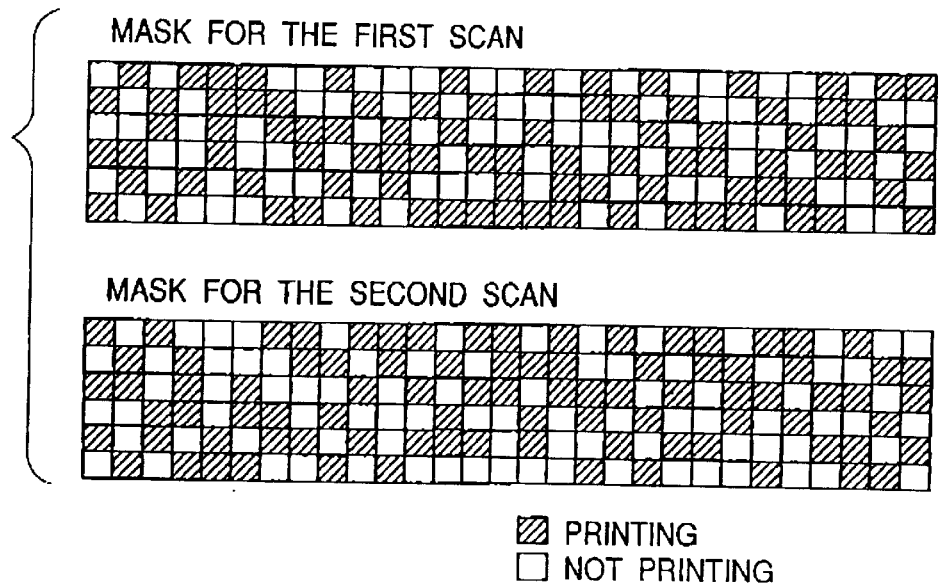
FIG. 19 illustrate a set of mask to be used for the first scan (top) and the second scan (bottom).

The above mentioned black ink according to the first aspect of the present invention has a remarkable advantage that it can greatly diminish the dependence of the record quality on the properties of the recording medium In addition, there is another advantage. FIG. 18 is a graph plotting the optical density of the recorded image to the pigment concentration, with the black ink of this aspect and a reference ink of the same composition but containing no salt. As shown in FIG. 18, with both inks, the optical density of the recorded image reaches to the similar value in the end, but the black ink of this aspect will reach the maximum value at a lower pigment concentration than the reference ink does. That is to say, by adding a salt to ink, the pigment concentration of the ink can be reduced without affecting the optical density of the recorded image.

<Ink Properties; Ink-jet Ejection Properties and Penetrability into the Recording Medium>

The black ink according to this aspect can be used for ink-jet recording as well as for hand-writing tools. As ink-jet recording methods, there are a recording method in which a mechanical energy is applied to the ink to eject an ink droplet and a recording method in which a thermal energy is applied to the ink to eject an ink droplet by the action of a bubble in the ink, for both of which the ink according to the present invention is especially suitable. When the ink set according to the aspect of the present invention is used for ink-jet recording, the ink should have properties of ejectability from an ink-jet head. From this point of view, the ink has liquid properties such as the viscosity of 1 to 15 cps, and the surface tension of preferably 25 mN/m (dyne/cm) or more, more preferably, 1 to 5 cP and 25 to 50 mN/m.

An index indicating the penetrability of ink into a recording medium is the Ka value determined by the Bristow method. Namely, when the penetrability of an ink is expressed by the ink amount V per m², the penetration amount V (ml/m²=μm) of the ink to a recording medium after a predetermined time t from the ejection of an ink droplet is expressed by the Bristow equation:

$$V = Vr + Ka(t-tw)^{1/2},$$

where tw is a contact time and Vr is an amount of ink absorbed into the rough portion of the recording medium.

Here, immediately after the landing of an ink droplet to the surface of the recording medium, almost all ink is absorbed in the rough portion of the recording medium (uneven surface portion of the recording medium) and nearly no ink has penetrated inside the recording medium. This period is defined as the contact time (tw) and the amount of ink absorbed in the rough portion during the contact time is defined as Vr. After the contact time, the amount of the ink penetrating into the recording medium increases in proportion to ½ power of the elapsed time exceeding the contact time, i.e., (t−tw). Ka is a proportional coefficient of this increment and corresponds to the penetration speed. The Ka value can be determined by using a test device on dynamic penetrability of liquid by the Bristow method (e.g., Dynamic Penetrability Testing Device S, trade name, a product of TOYO Seiki Mfg., Ltd.). Furthermore, in the ink according to the aspect mentioned above, it is preferable to set the Ka value to less than 1.5, more preferably, from 0.2 to less than 1.5, for further improvement of the image quality. When the Ka value is less than 1.5, the solid-liquid separation takes place at an early stage of the ink penetration process into the recording medium, to give high quality images with little feathering. Here, the Ka value by the Bristow method in the present invention is determined by using plain paper as the recording medium, such as PB paper (Canon) for copiers employing the electrophotographic process, page printers (laser beam printers), and printers employing the ink-jet recording process, and PPC paper to be used for copiers of the electrophotographic process. The measurement is carried out in presumptive office conditions such as a temperature of from 20 to 25° C. and humidity of from 40 to 60%.

Preferably, an aqueous medium which can provide the ink with the above mentioned desirable properties contains glycerol, trimethylol propane, thiodiglycol, ethylene glycol, diethylene glycol, isopropyl alcohol and acetylene alcohols.

<Color Ink>

Known dyes and pigments can be used as the coloring material of the color ink. Acid dyes and direct dyes may be used as such dyes. Almost all conventional and newly synthesized anionic dyes can be used as the coloring material so long as the color tone and density are proper. It is possible to use a mixture of them. Specific examples of anionic dyes are as follows.

<Yellow Coloring Materials>

C.I. Direct Yellow 8, 11, 12, 27, 28, 33, 39, 44, 50, 58, 85, 86, 87, 88, 89, 98, 100 and 110;

C.I. Acid Yellow 1, 3, 7, 11, 17, 23, 25, 29, 36, 38, 40, 42, 44, 76, 958 and 99;

C.I. Reactive Yellow 2, 3, 17, 25, 37 and 42; and

C.I. Food Yellow 3

<Red Coloring Materials>

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229 and 230;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C.I. Reactive Red 7, 12, 13, 15, 17, 20, 23, 24, 31, 42, 45, 46 and 59; and

C.I. Food Red 87, 92 and 94.

<Blue Coloring Materials>

C.I. Direct Blue 1, 15, 22, 25, 41, 76, 77, 80, 86, 90, 98, 106, 108, 120, 158, 163, 168, 199 and 226;

C.I. Acid Blue 1, 7, 9, 15, 22, 23, 25, 29, 40, 43, 59, 62, 74, 78, 80, 90, 100, 102, 104, 117, 127, 138, 158 and 161, and C.I. Reactive Blue 4, 5, 7, 13, 14, 15, 18, 19, 21, 26, 27, 29, 32, 38, 40, 44 and 100.

<Black Coloring Materials>

C.I. Direct Black 17, 19, 22, 31, 32, 51, 62, 71, 74, 112, 113, 154, 168 and 195

C.I. Acid Black 2, 4, 8, 51, 52, 110, 115 and 156; and

C.I. Food Black 1 and 2.

<Solvent>

As a solvent or dispersion medium for color ink containing a coloring material as mentioned above, water or a mixture of water and a water-soluble organic solvent can be used. As the water-soluble organic solvent, those as described for the black ink can be used. When the color ink is applied to the recording medium by an ink-jet method (such as the bubble-jet method), it is preferable to prepare the ink to have a desired viscosity and surface tension for excellent ejectability, as mentioned above.

<Coloring Material Content>

The content of the coloring material in the color ink may be selected to provide, for example, good ejectability when used for ink-jet recording, the desired color tone and color density. For reference, it may preferably be in the range of from 3 to 50% by weight to the total weight of the ink. the water content in the ink may preferably be in the range of from 50 to 95% by weight to the total ink weight. When the streakiness of the image density due to the ink application order is further considered, the dye concentration of the color ink is preferably less than 10% by weight to the total ink weight containing the dye.

<Penetrability of Color Ink>

The Ka value of the color ink is preferably 5 or more, because such an ink can form color images of high quality on the recording medium. That is, since an ink having such a Ka value is highly penetrating into the recording medium, the color bleeding between contiguous images can be suppressed when the two images are different in color, at least of two colors selected from, e.g., yellow, magenta and cyan. Further, when images of the secondary color are formed by overlapping these inks, bleeding between contiguous images of different colors can also be effectively controlled because each ink is highly penetrating. To prepare the color ink having a Ka value as defined above, known conventional methods can be used, for example, addition of a surfactant, or addition of a penetrating solvent such as glycol ether. Of course, the adding amount may be optionally selected.

<Recording Apparatus and Recording Method Using the Ink Set>

Next described is the recording apparatus according to the present invention. Suitable for the present invention is an ink-jet recording system where heat energy generated in the recording head according to a recording signal is applied to the ink to eject an ink droplet. Constitution of the recording head, a main part of the recording apparatus, is shown in FIGS. 1, 2 and 3.

The head 13 is formed by attaching glass, ceramic, silicon, or plastic etc. in which at least one ink flow path 14 is provided, to a heat generating head 15 (not limited to what is shown in Figures). The heat-generating head 15 is composed of a protective film 16 made of silicon oxide, silicone nitride, silicon carbide or the like, aluminum electrodes 17-1 and 17-2 made of aluminum, aluminum-copper alloy or the like, a heat-generating resistance layer 18 made of nichrome etc., a heat-accumulating layer 19, and a substrate 20 made of alumina etc. which is excellent in heat releasing The recording ink 21 comes to the ejection orifice 22, forming a meniscus 23 with pressure P.

Upon application of the electric signal to the electrodes 17-1 and 17-2 as a pulse, the heat generating head 15 rapidly generates heat at the region shown by "n" to form a bubble in the ink 21 in contact with this region. The meniscus 23 of the ink is ejected by the pressure of the bubble thus produced, and is ejected from the orifice 22 to a recording medium (for example, paper) 25 In the form of an ink droplet 24 to attach onto the recording medium 25. FIG. 3 schematically illustrates a recording head having an array of nozzles similar to that is shown in FIG. 1. This head is prepared by bonding a glass plate 27 having a number of flow path 26 to a heat generating head 28 similar to that is shown in FIG. 1.

Figure 1:
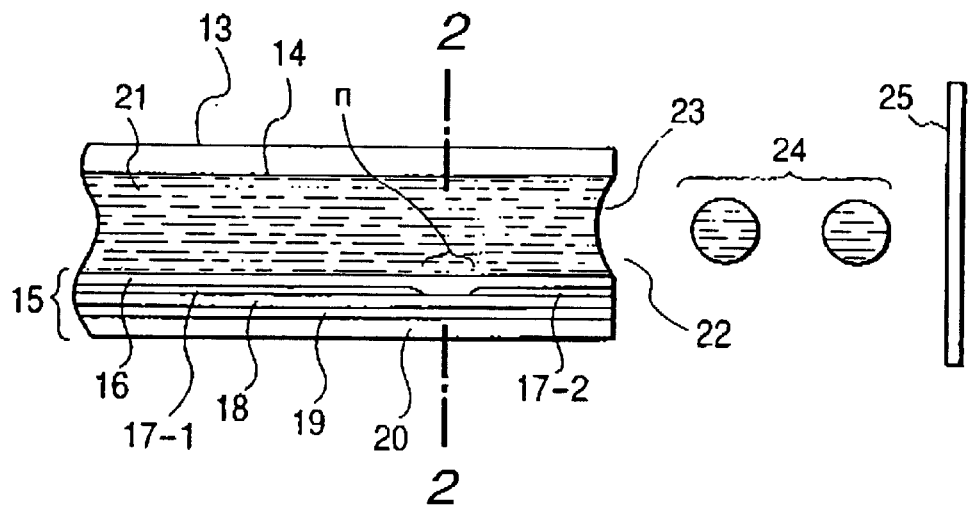
FIG. 1 is a longitudinal cross-sectional view of a head of an ink-jet recording apparatus.
Figure 2:
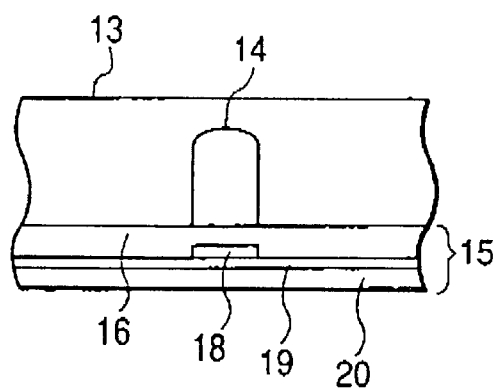
FIG. 2 is a transverse cross-sectional view taken along line 2—2 in FIG. 1.
Figure 3:
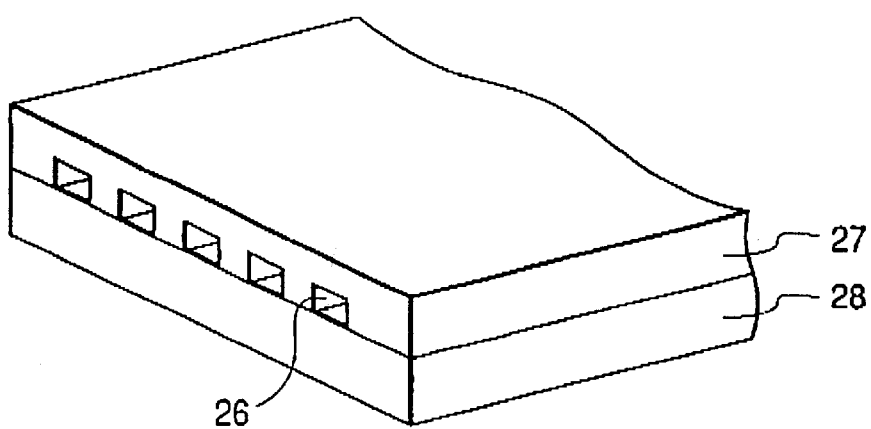
FIG. 3 is a perspective view of a head of an ink-jet recording apparatus.

Here, FIG. 1 is a schematic cross-sectional view of a head 13 taken along an ink flow path, and FIG. 2 is a cross-sectional view taken along line 2—2 in FIG. 1.

Figure 4:
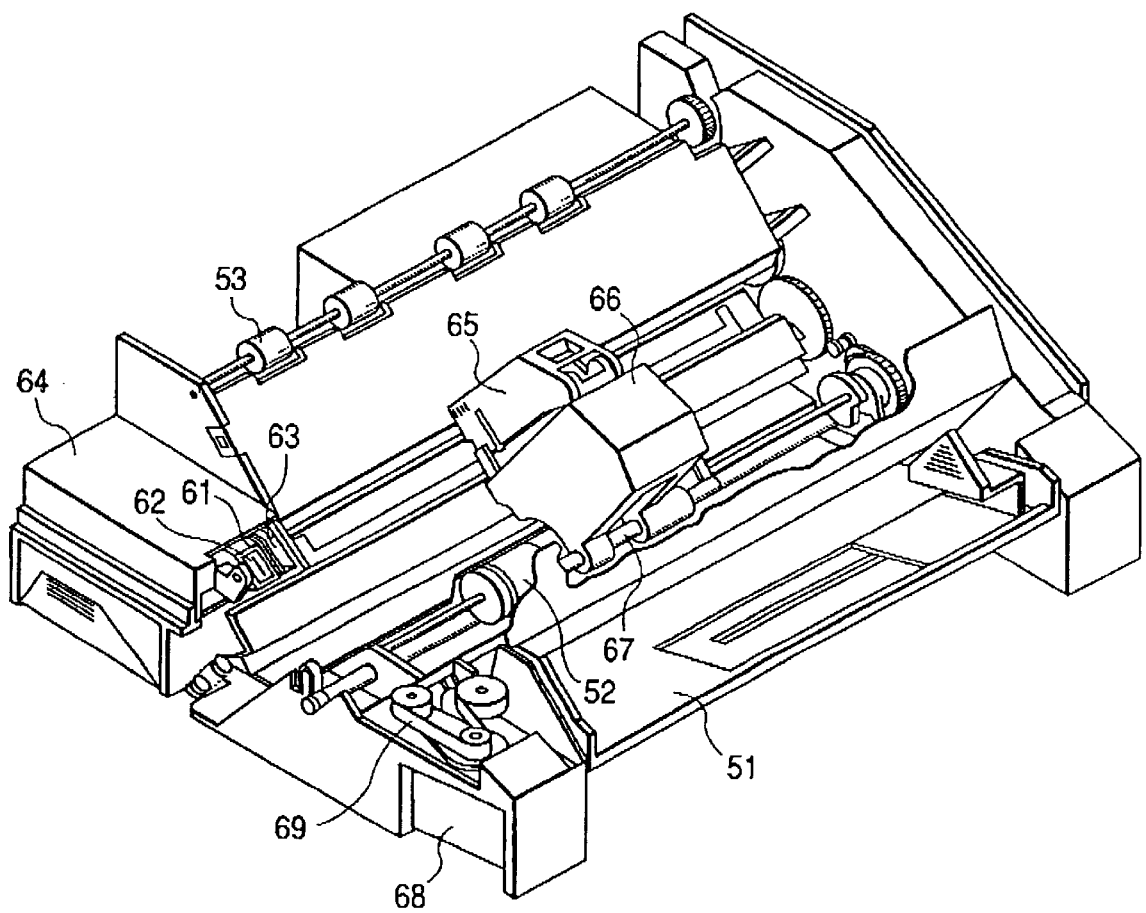
FIG. 4 is a perspective view of an ink-jet recording apparatus.

FIG. 4 illustrates an example of an ink-jet recording apparatus in which such a head as described above is incorporated. In FIG. 4, the blade 61 is a wiping member, one end of which is a fixed end held by a blade-holding member to cantilever. The blade 61 is provided at a position adjacent to a region in which a recording head 65 operates, and in this aspect, is held in such a form that it protrudes into the path of the recording head 65. Reference numeral 62 designates a cap for an ejection opening of the recording head 65, and the cap is arranged in a home position adjacent to the blade 61, moves in the direction perpendicular to the moving direction of the recording head 65, and caps the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery part 64, and the blade 61 and the ink-absorber 63 serve to remove moisture and dust on the ink-ejecting opening.

Reference numeral 65 designates a recording head. The head contains an energy generating means for ink ejection and performs recording by ejecting ink towards a recording medium opposite to the ink-ejecting opening. Numeral 66 designates a carriage for carrying the recording head 65 to move it. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a recording medium feeding part for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the image recording apparatus according to this aspect of the invention, the recording head is moved forward and backward along a direction perpendicular to the recording medium-carrying direction, and in the both forward and backward ways, the head can apply at least one of black ink and color ink to the recording medium. Recording data processing may be done utilizing conventional technology relating to the both-way printing.

In the above arrangement, while the recording head returns to its home position after recording, the cap 62 of the ejection recovery part 64 recedes from the moving path of the recording head, but the blade 61 is projecting in the moving path. As a result, the ink ejecting opening of the recording head 65 is wiped.

When the cap 62 comes into contact with the ejection opening face of the recording head 65 to cap it, the cap 62 moves so as to protrude into the path of motion of the recording head 65.

When the recording head 65 is moved from its home position to the position at which recording is started, the cap 62 and the blade 61 are at the same positions as the wiping position as described above. As a result, the ejection opening of the recording head 65 is also wiped at the time of this movement.

The above movement of the recording head 65 to its home position is made not only when the recording is completed or for ejection recovery, but also when the recording head 65 is moving in the recording region for recording, that is, it moves to the home position adjacent to the recording region at given intervals during recording, so as to wipe the ejection opening face with this movement.

Figure 5:
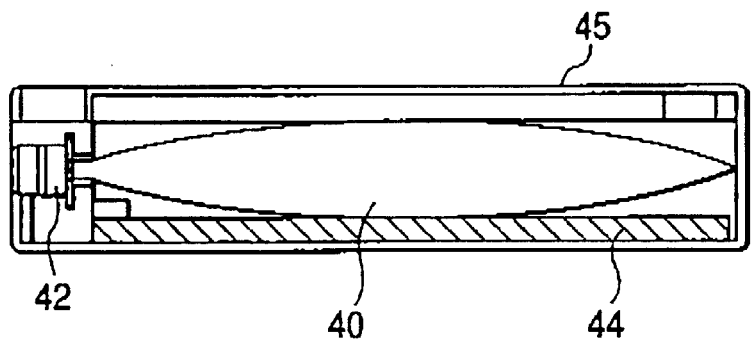
FIG. 5 is a longitudinal cross-sectional view of an ink cartridge.
Figure 14:
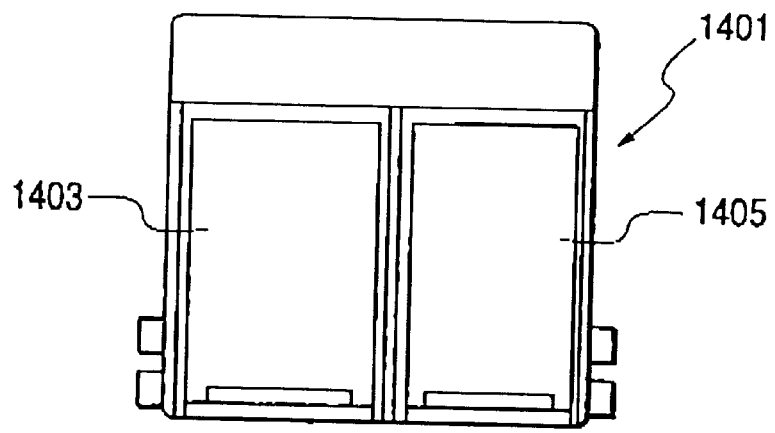
FIG. 14 is a schematic plan view of an ink cartridge according to one aspect of the invention.
Figure 15:
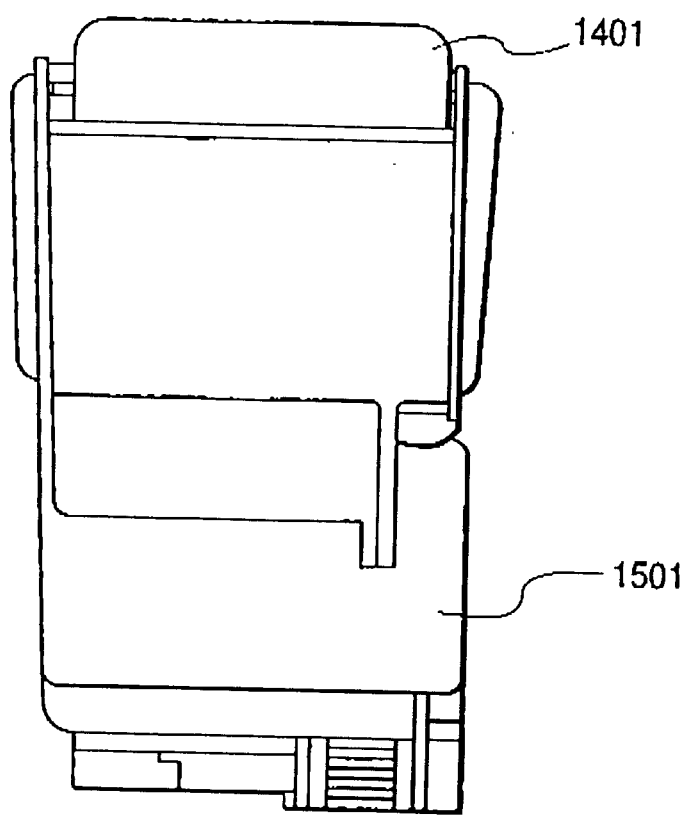
FIG. 15 is a schematic plan view of the ink cartridge of FIG. 14 mounted on a recording head.

FIG. 5 shows one example of an ink cartridge for storing ink for feeding ink to the recording head through an ink feeding member such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene. As another embodiment of the cartridge in the present invention, there is a cartridge which has two storing parts for storing black ink and color ink separately to supply each ink to the recording head which can discharge the black ink and the color ink, where the cartridge is designed to be freely detachable from the recording head. FIG. 14 shows an example of such a cartridge 1401:1403 is a black ink storing part to store a black ink; and 1405 is a color ink storing part to store a color ink. The cartridge as shown in FIG. 15 is constituted to be freely detachable from the recording head 1501 and to supply the inks to the recording head 1501 when the cartridge 1401 is mounted to the recording head 1501.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
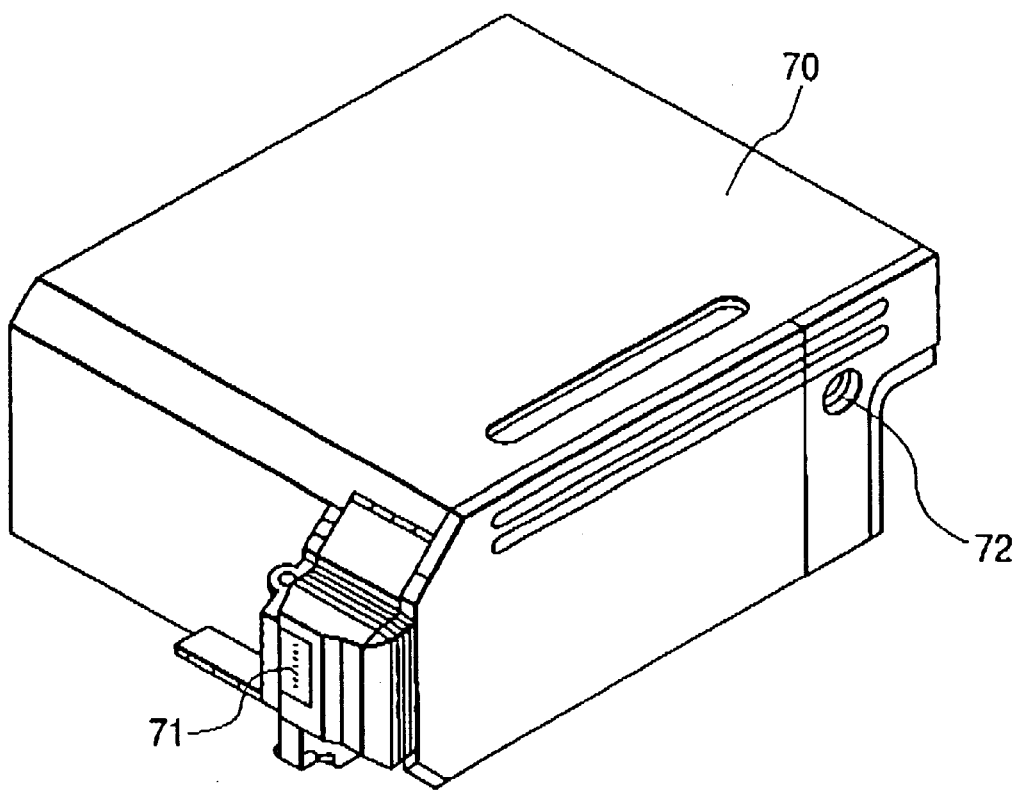
FIG. 6 is a perspective view of an ink-jet recording unit.

In FIG. 6, reference numeral 70 designates a recording unit containing an ink storing portion containing an ink, for example, an ink-absorbing member in it. The ink contained in the ink-absorbing member is ejected as an ink droplet from a head 71 having a plurality of orifices. As a material for the ink-absorbing member, polyurethane may be preferably used. Reference numeral 72 indicates an air passage for communicating the interior of the recording unit 70 with the atmosphere. This recording unit 70 can be used in place of the recording head 65 shown in FIG. 4, and detachably installed on the carriage 66.

Figure 16:
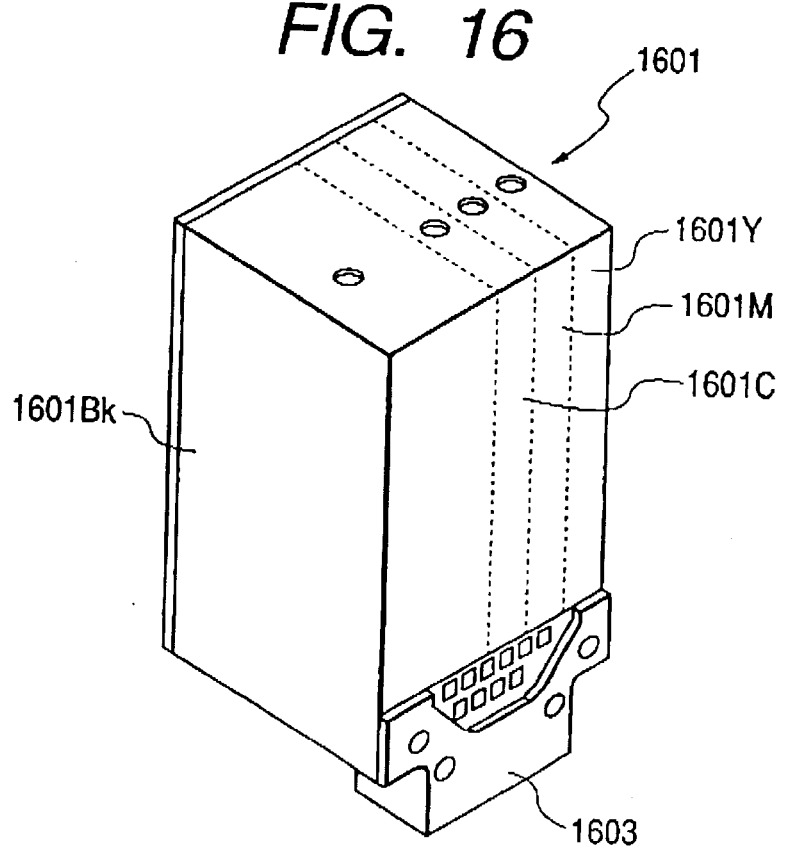
FIG. 16 is a schematic perspective view of a recording unit according to one aspect of the invention.

Further, as another embodiment of the recording unit in the present invention, there is a recording unit in which black ink and color ink (at least one color ink selected from e.g., yellow, magenta, cyan, red, green and blue) are separately stored in the ink storing parts in an ink tank and the ink tank and the recording head for discharging each ink are united. For example, as shown in FIG. 16, there is a recording unit 1601 united with a recording head 1603, in which black ink is stored in the storing part 1601 Bk, while color inks of yellow, cyan and magenta are stored in the color ink storing parts 1601Y, 1601M and 1601C, respectively, and the recording head is constituted to have divided ink flow paths so as to discharge the inks separately.

In addition to the ink-jet recording apparatus utilizing thermal energy as described above, the present invention is applicable to a recording apparatus having an ink-discharging system utilizing dynamic energy for ink ejection, e.g., an ink jet recording apparatus of a piezo system using a piezoelectric element.

Figure 17:
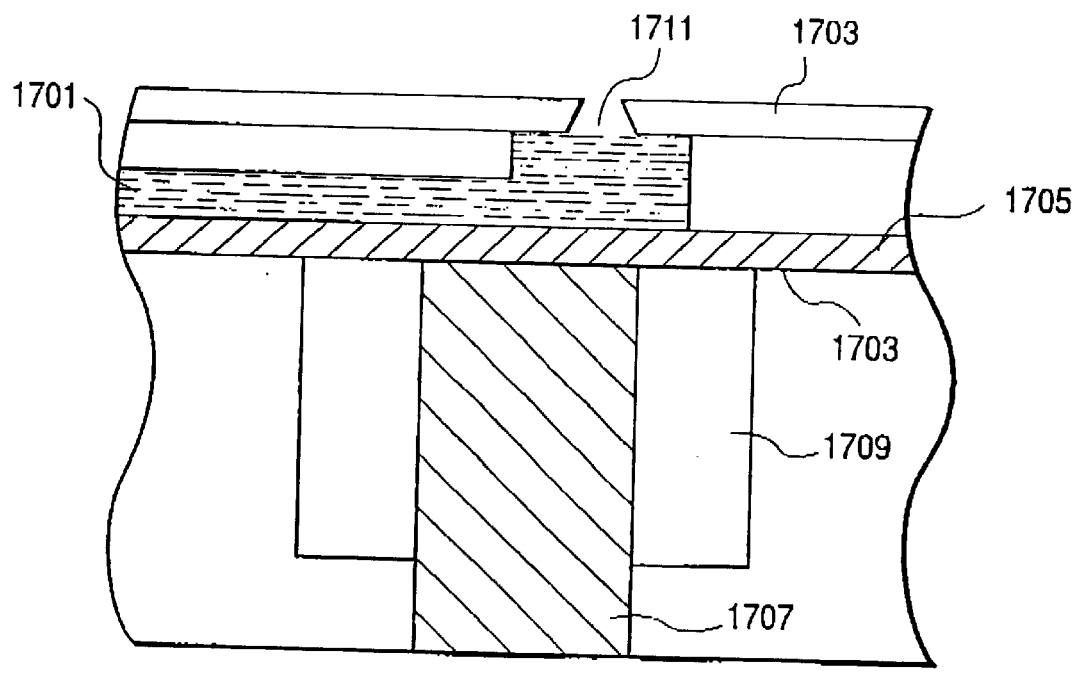
FIG. 17 shows an enlarged view of the orifice of a recording head of an ink-jet recorder.

A configuration example of the recording head which is the principal part of such a recording apparatus is shown in FIG. 17. The head is constituted of: ink flow path 1701 leading to the ink chamber (not shown); orifice plate 1703 to discharge an ink droplet of the desired volume; and vibration plate 1705 which applies a pressure directly to the ink: piezoelectric element 1707 which is connected with the vibration plate 1705 and deforms by the electric signals; and base plate 1709 to hold and fix the orifice plate 1703, the vibration plate, etc. In FIG. 17, the ink flow path 1701 is made from a photosensitive resin; the orifice plate 1703 which is made of a metal such as stainless steel and nickel; the ejection orifice 1711 which is formed by making a hole in the orifice plate 1703 by electrocasting or press processing; the vibration plate 1705 which is made from a metal film such as stainless steel, nickel and titanium and a highly elastic resin film; and the piezoelectric element 1707 which is made from a dielectric material such as barium titanate and PZT. The recording head of the above constitution works as follows: when a pulse-like voltage is given to the piezoelectric element 1707, a strain stress is generated, of which energy deforms the vibration plate connected with the piezoelectric element 1707 to apply pressure vertically to the ink in the ink flow path 1701, and an ink droplet (not shown) is discharged from the orifice 1711 of the orifice plate 1703 to perform recording. Such a recording head is incorporated into the recording apparatus similar to the one shown in FIG. 4. Detailed action of the parts of the recording apparatus may be the same as mentioned above.

<Solving the Unevenness Due to Ink Application Order>

Figure 7:
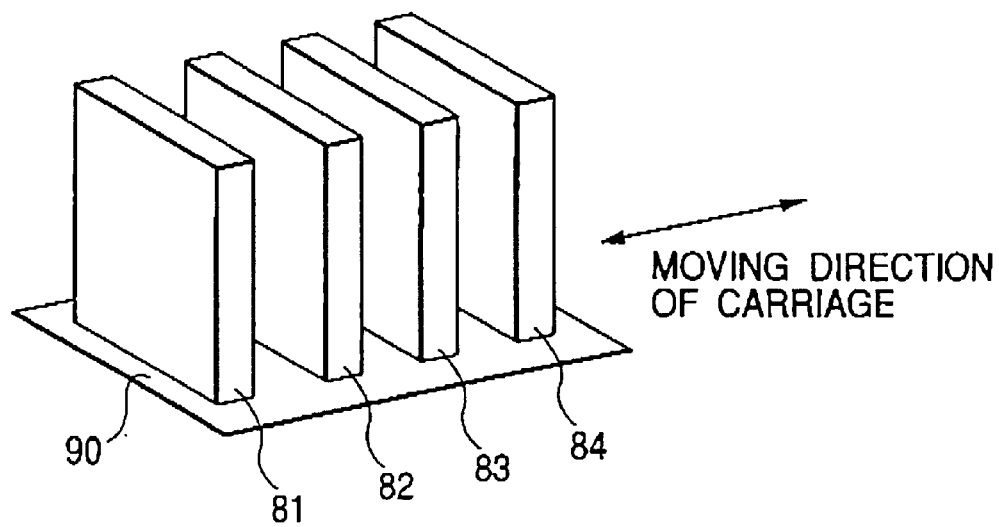
FIG. 7 is a perspective view of a recording unit used in Examples where multiple recording heads are arranged.

In the recording method according to the aspect of the present invention, it is used a recording apparatus in which four recording heads shown in FIG. 3 mentioned above are arranged on a carriage. FIG. 7 shows one example. Numerals 81, 82, 83 and 84 designate the recording heads for discharging yellow, magenta, cyan and black inks respectively. These heads are arranged in the above described recording apparatus and the recording ink of each color is discharged in response to the recording signals. Also by disposing color inks in a vertical order as shown in FIG. 8, unevenness in color due to the application order of the color inks in both-way recording can be dissolved.

Figure 8:
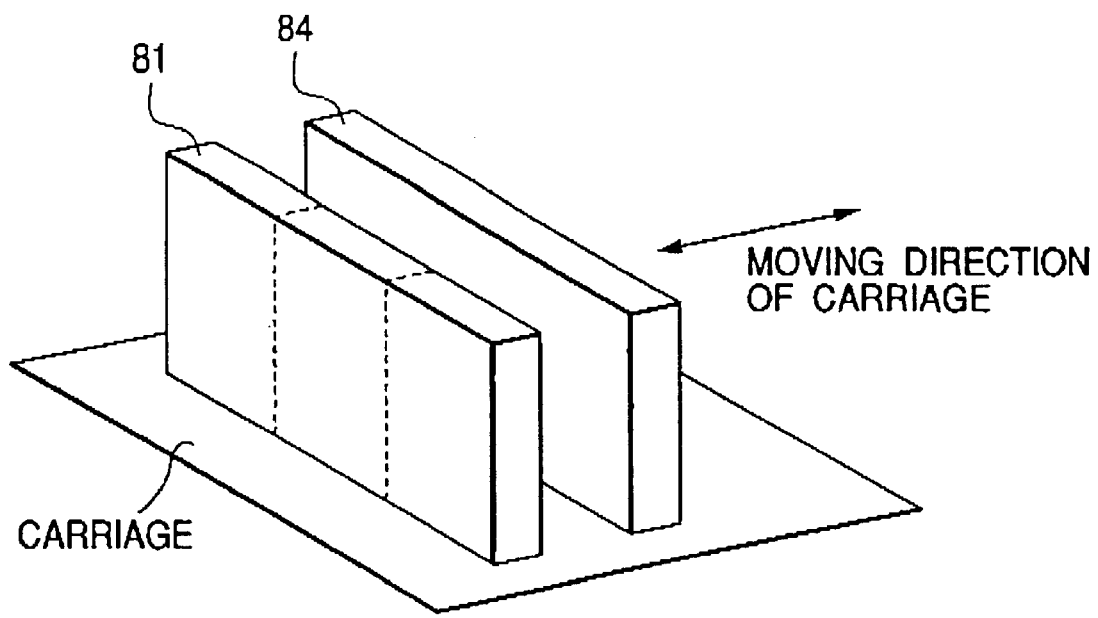
FIG. 8 is a perspective view of another recording head to be used in the present invention.

That is, in the both-way recording where recording is carried out in the both right and left directions, the principal scan direction, by the head as shown in FIGS. 7 and 8, it may occur that the black and color inks are given to the same region of the recording medium. If a conventional black ink of low penetrability and a color ink of high penetrability are used, the image density may vary at such regions according to the ink application order, whether a color ink is applied first, or a black ink is applied first. This phenomenon is conspicuous with the one-pass recording, where one principal scanning makes an image region of which width is the length of the recording head, thereby quality of the multi-color image sometimes is lowered. As already mentioned, this is the technical problem to be solved to form a high quality image in a short time in which black ink and color ink coexist.

Further, when multi-pass recording is carried out by using a recording head as shown in FIGS. 7 and 8, with different masks for different colors, the image contains the regions where the black ink is applied first and then the color ink, and the regions where the color ink first and then the black ink. Coexistence of such regions leads to the irregular unevenness in the image density.

Figure 20:
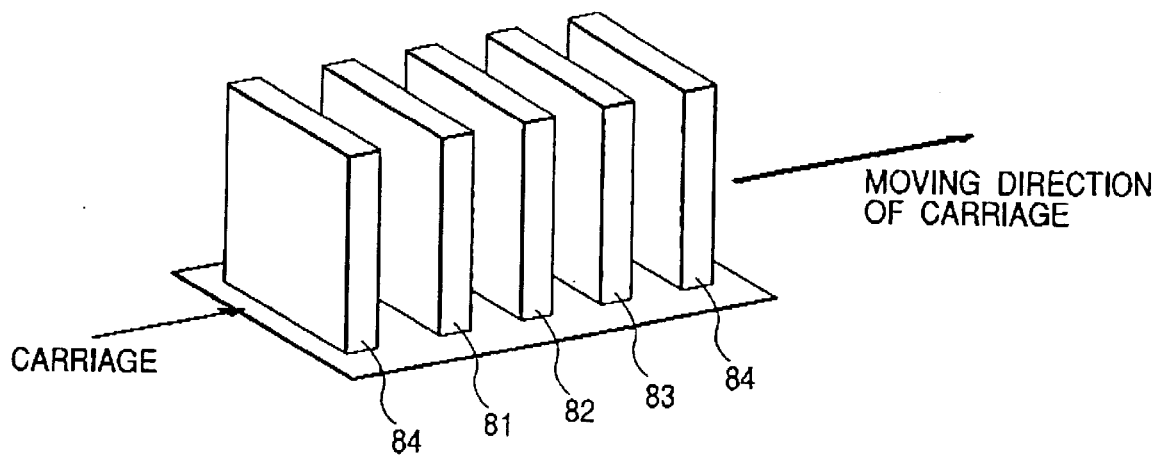
FIG. 20 is a perspective view of a recording unit where two heads containing black ink are allocated on the either sides of the color ink heads.

Further, even when the black image is formed with two heads in the head constitution as shown in FIG. 20, there are regions where the black ink and the color ink are applied in reverse orders, which will lead to irregularity in the image density.

According to the present aspect of the invention, when the black ink is applied onto the surface of the recording medium, the salt in the black ink is considered to enhance the separation of the coloring material from the aqueous medium in the black ink (solid-liquid separation). Accordingly, even if the black ink is given after a color ink of high penetrability to the recording medium, the coloring material will remain on the surface of the recording medium since the solid-liquid separation effectively prevents the coloring material from diffusing into the recording medium. As a result, even in one-pass both-way recording which forms an image at one principal scanning, streakiness of both-way recording can be effectively controlled, forming ink-jet multicolor images of high quality in a short time. In the multi-pass recording, it is also possible to effectively suppress irregular image density to give images of excellent uniform feeling.

<The Second Embodiment>

Next, a second aspect of the present invention is explained. The second aspect of the invention can further improve the streakiness of both-way recording and is suitable for obtaining images of higher quality even in comparison with the first aspect of the invention. It is generally considered that the visual optical density of an image formed on a recording medium is determined by the amount of the coloring material present in the recording medium within a depth of about 15–30 $\mu$m from the surface. Thus, in order to obtain an image of high density, the coloring material should be present at a high concentration within the above region, according to this aspect, by using a black ink containing an aqueous medium, salt, and a pigment dispersed in the aqueous medium by the action of an ionic group, and a color ink containing a dye as a coloring material and a component which destabilizes the dispersibility of pigment, it is possible to increase the occupation density of the coloring material within the above-mentioned region of the recording medium to suppress the streakiness of both-way recording quite effectively.

Second Aspect (1)

First explained is the situation where the component to destabilize the pigment dispersibility of the black ink is the dye in the color ink itself, that is, the dye in the color ink directly reacts with the pigment.

Figure 13A:
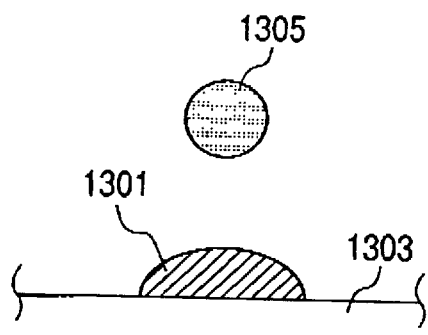
FIGS. 13A, 13B, 13C, 13D, 13E and 13F illustrate the behavior of the coloring materials when a pigment ink containing a salt and a color ink reactive with the black ink are applied onto a recording medium.
Figure 13B:
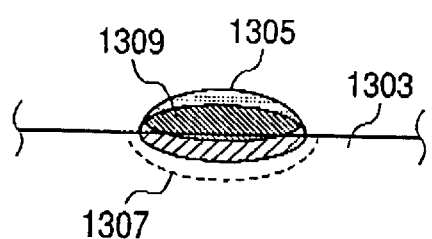
Figure 13C:
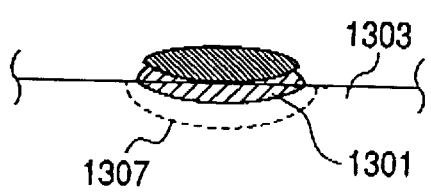
Figure 13D:
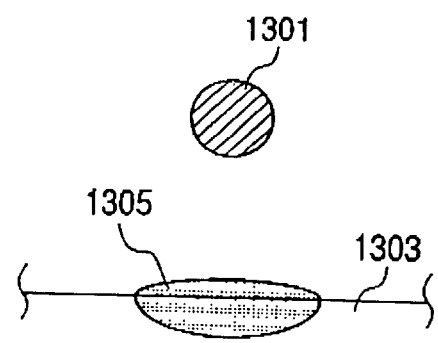
Figure 13E:
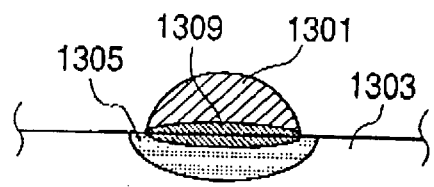
Figure 13F:
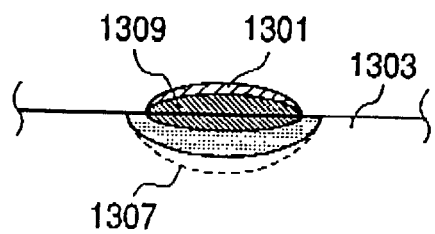

FIGS. 13D to 13F schematically illustrate the ink behavior on the recording medium when an ink set according to the present invention is applied onto the recording medium in an order of color ink and then black ink. Since the black ink 1301 is applied onto the recording medium 1303 of which permeability has increased because of the firstly applied color ink 1305, the penetration speed of the black ink into the recording medium is increased, but due to the salt present in the black ink, the solid-liquid separation of the black ink occurs faster than the ink penetration into the recording medium, and solidification of the coloring material in the ink occurs rapidly, penetration of the coloring material in the black ink is inhibited as shown in FIG. 13F. Further, the dye in the color ink reacts with the black ink on the surface of the recording medium to form aggregates 1309, and the ink penetration into the recording medium is suppressed more effectively. In addition, the unreacted pigment in the black ink will be held on the aggregates as shown In FIG. 13F. As a result, a recorded matter of high optical density can be obtained. In FIGS. 13B to 13F, numeral 1307 represents the moving front of the aqueous solvent in the ink.

FIGS. 13A to 13C illustrate the situation when black ink is applied prior to the color ink. The black ink of low penetrability covers the recording medium 1303 as shown in FIG. 13A and slowly penetrates into the recording medium 1303, and the pigment in the black ink rapidly form aggregates by the action of the salt on the surface of the recording medium. After that, the color ink 1305 of high penetrability is applied as shown in FIG. 13B, but the penetration speed of the black ink will not change much, since the surface of the recording medium is covered with the rapidly aggregating black ink. As a result, the pigment in the black ink tends to remain on the surface of the recording medium 1303 as shown in FIG. 13C. Further, the color ink is mixed with the black ink while the sufficient amount of the black ink is present on the surface of the recording medium, the dye and the pigment can fully react to deposit a large amount of mixed aggregates of the dye and pigment 1309 on the recording medium, to give high image density. Although the dye in the color ink covers the dye-pigment aggregates, the dye concentration of the ink-jet ink is not so high as to cause visually discriminable difference in the image density in comparison with the image formed as shown in FIGS. 13D to 13F.

The reason why the difference in the image density due to the application order of the black and color inks is suppressed according to this aspect of the invention is as mentioned above. In FIG. 23E, the point 2341 represents the amount of the pigment present in the upper part of the recording medium and the obtained optical density, when only the black ink of the ink set according to this aspect was applied onto the recording medium. In this case, the optical density is high because of the presence of salt. When the color ink was applied prior to the black ink, the decrease of the fixed black ink due to the high penetrability of the color ink is negligible as represented by the point 2342, because of the reaction between the black ink and the color ink and the rapid solid-liquid separation due to the salt in the black ink. As mentioned above, the dye reacted with the pigment participates in the aggregate formation and sets on the surface of the recording medium. Accordingly, strictly speaking, the relationship between the amount of the fixed coloring material and the density of the image formed by superimposing the black and color inks is not plotted on the curve of a single pigment system. The difference is represented by the difference between the curve on which point 2341 is present and the curve on which points 2342 and 2343 are present (2345). However, as the dye concentration in the ink-jet ink is not so high, being about 10% by weight or less, this difference is not visually discriminable. When the black ink is applied to the recording medium prior to the color ink (2343), the solid-liquid separation occurs rapidly, and the pigment and the dye are sufficiently mixed on the surface of the recording medium, so that a sufficient amount of the pigment-dye aggregates is fixed in the upper part of the recording medium to show high image density. By such a mechanism, the streakiness of both-way recording (difference in the image density due to the application order of the color ink and the black ink) (2334) can be suppressed effectively, since both cases can obtain high image density.

Besides, the dye content in the color ink is preferably 10% by weight or less based on the total weight of the color ink. With such a concentration, the effect of the dye depositing on the aggregates when the black ink is applied prior to the color ink is too small to enlarge the difference in the image density compared with when the inks are applied in the reverse order (2344). Thus, the density unevenness due to the ink application order can be prevented effectively to achieve a level that there is visually no or almost no difference in the image density.

Second Aspect (2)

Reaction System (2)

Finally, another form of the second aspect is explained, where the component to destabilize the dispersibility of the pigment in the black ink is an additive in the color ink.

Figure 24A:
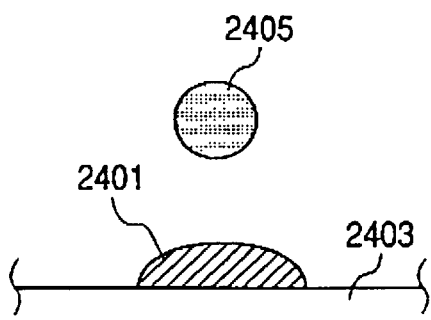
FIGS. 24A, 24B, 24C, 24D, 24E, 24F and 24G illustrate the behavior of the ink and coloring materials on the recording medium when an image is formed by using an ink set according to (2) of the second aspect of the invention, superimposing black ink and color ink.
Figure 24E:
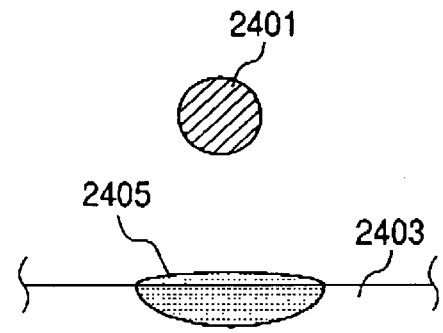
Figure 24B:
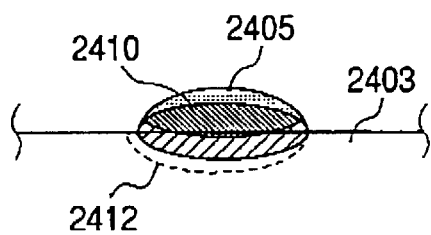
Figure 24F:
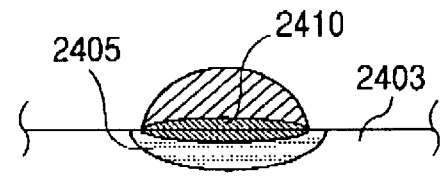
Figure 24C:
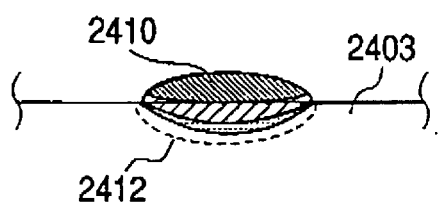
Figure 24G:
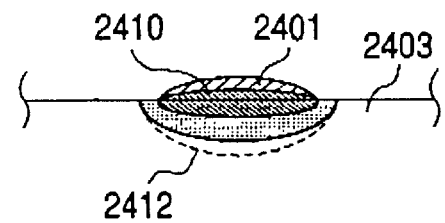
Figure 24D:
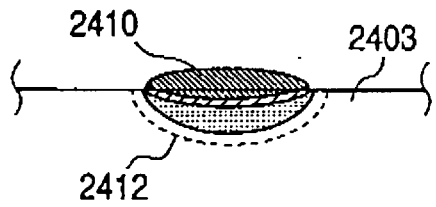

FIGS. 24E to 24G illustrate the ink behavior on the recording medium when an ink set according to the present invention is applied onto the recording medium in an order of color ink and then black ink. Since the black ink 2401 is applied onto the recording medium 2403 of which permeability has increased because of the firstly applied color ink 2405, the penetration speed of the black ink into the recording medium is increased, but due to the salt being present in the black ink, the solid-liquid separation of the black ink occurs faster than the penetration of the coloring material in the black ink into the recording medium and the solidification of the coloring material in the ink occurs rapidly.

Further, the additive in the color ink reacts with the black ink on the surface of the recording medium to destabilize the dispersion state of the pigment in the black ink and pigment aggregates 2410 is deposits. As a result, the ink penetration into the recording medium is suppressed effectively, and the pigment aggregate 2410 is present in the upper part of the recording medium as shown in FIG. 24G, to maintain high image density. According to this aspect of the invention, the coloring material in the color ink does not participate in the reaction with the black ink, and because of the high penetrability of the color ink, it rapidly diffuses into the recording medium, so that it hardly occurs the increase of the image density due to the dye in the color ink. The numeral 2412 represents the moving front of the aqueous solvent in the ink.

Figure 23F:
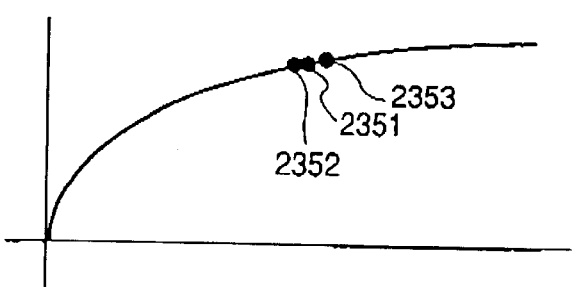

FIGS. 24A to 24C illustrate the situation when black ink is applied prior to the color ink. The black ink of low penetrability covers the recording medium 2403 as shown in FIG. 24A and slowly penetrates into the recording medium 2403, and the pigment in the black ink undergoes rapid solid-liquid separation with rapidly aggregate formation by the action of the salt in the ink. After that, when the color ink 2405 of high penetrability is applied as shown in FIG. 24B, the penetration speed of the black ink will not change much, since the surface of the recording medium is covered with the black ink. In such a situation, due to the slow penetration speed of both the black ink 2401 and color ink 2405 into the recording medium 2403, the pigment in the black ink tends to remain on the surface of the recording medium 1303 as shown in FIG. 24C. Further, as the color ink is mixed with the black ink while the sufficient amount of the black ink is present on the surface of the recording medium, the reactive component in the color ink and the pigment can fully react to deposit a large amount of the pigment aggregate 2410 on the recording medium, to give high image density. Although the dye in the color ink sets on the pigment aggregate 2401 in this process, it would not bring about visually discriminable difference in the image density in comparison with the image formed by applying the color ink and the black ink in this order as shown in FIGS. 24E to 24G, because usually the dye concentration in the ink-jet ink is not so high. Therefore, the dye concentration of the color ink is preferably 10% by weight or less based on the total weight of the color ink. In addition, some dye in the color ink might penetrate into the recording medium passing through the pigment aggregate. Above discussed is the reason why the difference in the image density according to the ink application order can be suppressed according to the present aspect. This result of this aspect is shown in FIG. 23F where the point 2351 represents the optical density of an image formed with the black ink only, the point 2352 with the color ink followed by the black ink, and the point 2343 with the black ink followed by the color ink, and these three points are extremely close, that is, although the aforementioned second aspect (1) can improve the unevenness in density due to the ink application order to a level of practically no problem, the second aspect (2) can improve it ideally.

A variation of the above second aspect, where the color ink contains a dye and an additive both of which destabilize the pigment of the black ink when mixed to the black ink, is also in the scope of the present invention.

As mentioned above, the second aspect of the present invention is characterized in that the compositions of the color ink and the black ink used in the first aspect are modified so that the dispersion stability of the coloring material in the black ink may become unstable when the color ink and the black ink are mixed.

<Reactivity of Black and Color Inks>

Preferably, the black ink and the color ink of this aspect of the invention have compositions which destabilize the dispersion stability of the coloring material in the black ink when mixed each other, for example, by reaction to increase the viscosity or by aggregation Examples of such combination of black ink and color ink are as follows.

(1) Use the dye in the color ink as the component to destabilize the dispersion stability of the pigment in the black ink (2) The color ink contains an additive which destabilizes the dispersion stability of the pigment in the black ink.

Specifically, the above aspect (1) includes following i) and ii).

i) The pigment in the black ink has an anionic group and the dye in the color ink has a cationic group. In this example, when the color ink and the black ink are mixed, the cationic group of the dye in the color ink reacts with the anionic group of the pigment in the black ink to destruct the dispersion state of the pigment, leading to the pigment aggregation, or the increase of the ink viscosity. Here the content of the dye in the color ink is preferably about 0.1–10% by weight based on the total weight of the color ink.

ii) The pigment in the black ink has an cationic group and the dye in the color ink has an anionic group. In this example, when the color ink and the black ink are mixed, the anionic group of the dye in the color ink reacts with the cationic group of the pigment in the black ink to destruct the dispersion state of the pigment, leading to the pigment aggregation. Viscosity of the ink also increases. Here the content of the dye in the color ink is preferably about 0.1–10% by weight based on the total weight of the color ink.

Specifically, the above aspect (2) includes following i)–iii).

i) The pigment in the black ink has an anionic group and the color ink contains at least a salt of polyvalent metal cation, for example, selected from $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$. When the color ink and the black ink are mixed, the polyvalent metal cation of the polyvalent metal salt in the color ink reacts with the anionic group of the pigment in the black ink, leading to dispersion destruction of the pigment, and pigment aggregation in the black ink. Viscosity of the ink also increases. Here the content of the polyvalent metal salt in the color ink is preferably about 0.1–15% by weight based on the total weight of the color ink.

ii) The pigment in the black ink is characteristically dispersed stably at pH 3–7 and the color ink is adjusted to pH 8–11.

When the inks are mixed, pH of the black ink rises to destruct dispersion stability of the pigment, and the pigment aggregates to increase the viscosity of the ink.

iii) The pigment in the black ink is characteristically dispersed stably at pH 7–11 and the color ink is adjusted to pH 3–6.

When the inks are mixed, pH of the black ink is lowered to destruct dispersion stability of the pigment, and the pigment aggregates to increase the viscosity of the ink.

<Unevenness in Image Density Due to the Application Order>

Various recording methods such as both-way recording where recording is carried out during the scanning of the head as shown in FIGS. 7 and 8 in both principal directions of left and right, the multi-pass recording using different masks for each black and color inks, and the recording method using a head as shown in FIG. 20 equipped with multiple heads for the same color, will form on the recording medium an image which contains sites formed by applying the black ink and the color ink in different orders.

According to this aspect, as explained above, by using an ink set which comprises a black ink containing a salt and a color ink reactive with the black ink, streakiness of both-way recording is further suppressed, the uniform feeling of the image formed by applying the black ink prior to the color ink is further improved, and images of high density can be obtained. This aspect provides an ink set which can give images which is sharp and of high quality, an ink jet recording method and ink jet apparatus using it.

<Prevention of Bleeding and Haze>

According to the second aspect of the invention, further advantages are achieved such that when the image density is compared between an black image region formed by solely applying black ink (first black region) and a black image region formed by superimposing black ink and color ink (second black region), no visible difference is observed, and the obtained images are free from bleeding or haze and have visually uniform feeling. This is explained below.

The ink-jet recording method has a problem that when different two inks are applied in abutting regions on the recording medium, the inks are mixed each other at the boundary of the regions to degrade the color image quality. This phenomenon is called "bleeding". Particularly, color mixing at the boundary between black ink and color ink seriously degrades the image quality. Accordingly, various methods have been developed to solve this problem.

One of the representative ideas is an ink set which can prevent bleeding by inducing precipitation or aggregation of at least one of the coloring materials, or viscosity increase of at least one of the inks, when two different inks are applied in an abutting manner on the recording medium. U.S. Pat. No. 5,428,383, for example, discloses that one ink contains a precipitation agent (e.g., polyvalent metal salt), and the other ink, preferably black ink, contains an organic dyestuff having carboxyl and/or carboxylate group as the coloring agent. When these inks are applied contiguously, the first ink containing the precipitation agent precipitates the coloring agent having carboxyl and/or carboxylate groups, thereby prevents the migration of the coloring agent into the first ink region, to diminish the bleeding between the two abutting record regions. U.S. Pat. No. 5,976,230 discloses a technology to prevent bleeding by applying two inks reactive each other onto the same region.

The present inventors, however, have found that the images obtained by a method applying two inks reactive each other onto the same region as disclosed in U.S. Pat. No. 5,976,230 are denser than those obtained with a single ink. As disclosed in Japanese patent Laid-Open Patent Application No. 6-171208 (an application by the same applicant as with the present application), an image having higher density is obtained by landing a pigment black ink and a color ink containing a salt to the same point on the recording medium by the ink-jet method, in comparison with the images formed solely with black ink. Increase of the image density by the reactive ink set itself is nothing wrong. However, when the black region in one document contains regions formed with black ink only and regions formed with both black ink and color ink, the image density may differ each other to give visually incongruous images. More specifically, when in one document a black character region having no color background (first character region) and a black character region having color background (second character region) are present in a mixed fashion, and the first black region is formed with black ink only and the second black region is formed by the method of U.S. Pat. No. 5,976,230 in order to prevent bleeding by superimposing a black ink and a color ink reactive with the black ink, the visual density may be clearly different between these two regions, causing incongruous feeling. To solve this problem, one may think to form the first black region in the same manner as with the second region. However, this has problems that it requires larger consumption of the color ink, and as the color ink applied before the black ink diffuses into the recording medium more than the black ink because of its high penetrability, the black character sometimes appears to be bordered with the color ink. On the basis of the above findings, the present inventors have studied and found out that by using an ink set according to the second aspect of the invention, the image density of a black region formed with a black ink only can be improved to the same level of that obtained by mixing a black ink and a color ink reactive with the black ink.

As explained above, when the black ink and the color ink according to the second aspect of the invention are superimposed on the recording medium, high image density can be obtained regardless the ink application order.

Figure 25:
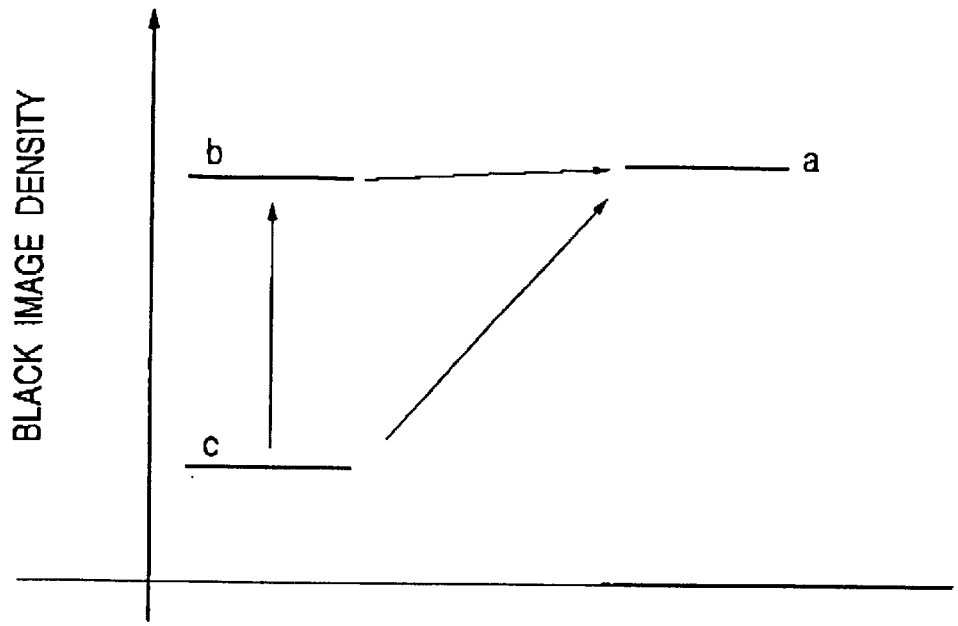
FIG. 25 illustrates the relationship between the optical density of the images formed with: (a) an ink set according to the second aspect of the invention, (b) black ink containing a salt of the invention, and (c) control black ink not containing salt.

Also, as explained above, the solid-liquid separation of the black ink containing a salt occurs rapidly in comparison with a black ink containing no salt, and more pigment in the ink is retained in the upper part of the recording medium, to give images of high density. As a result, as shown in FIG. 25, difference in the visual density between the image formed with black ink only, and the image formed by superimposing black ink and color ink, can be diminished or dissolved. That is, in FIG. 25, the point a represents the black image density formed by superimposing a black ink containing a salt and a color ink reactive with the black ink, the point b represents the black image density formed solely with the black ink containing a salt, and the point c represents the black image density formed solely with a control black ink containing no salt. As clearly seen from FIG. 25, use of the ink set of the invention can diminish the difference present between a and c, and that difference in image density between a and b is almost invisible.

Further, another advantage of this aspect is that when recording is carried out by using the ink set according to this aspect, monotone images of excellent gradation can be obtained. That is, in the prior arts, when black ink and color ink are applied one upon another for monotone gradation expression, formed image may suffer from a problem of different optical density by the reason as described above, and the formulation ratio of black ink and color ink is limited to obtain smooth gradation expression. This leads to problems such as the reduced freedom in design or deterioration of gradation expression itself. By using the ink set according to the invention, it is possible to make the image density of the region formed with black ink and color ink and that of the region formed solely with black ink the same. Thus, any gradation expression becomes possible by controlling the ratio of the black ink to the color ink. For example, the optical density of the black image formed solely with the black ink can be deemed as the maximum value of the image density and any image density lower than this value can be obtained by controlling the amount of the color ink to be applied.

Hereinafter, referring to Examples and Comparative Examples, the present invention will be described in more detail. The present invention, however, is not limited to following Examples so long as it is within the gist thereof. Here, "part" and "%" is based on weight unless otherwise stated.

Experimental Example I

(1) Production and Evaluation of the Ink Sets According to the First and Second Aspects First, Pigment dispersion 1 was prepared.

Pigment Dispersion 1

Ten grams of carbon black having a surface area of 230 m²/g and DBP oil absorption of 70 ml/100 g and 3.41 g of p-amino-benzoic acid are mixed with 72 g of water, to which 1.62 g of nitric acid was added drop by drop with stirring at 70° C. Several minutes later, a solution of 1.07 g of sodium nitrite dissolved in 5 g of water was added, and stirred for 1 hour. The obtained slurry was filtered through a filter paper, TOYO Filter Paper No. 2 (trade name, a product of Advantis Co.), and the pigment particles filtered out were fully washed with water and dried in a 90° C. oven. Then water was added to this pigment to prepare a 10% aqueous dispersion of the pigment. By the above method, a group of the chemical formula:

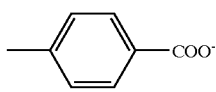

was introduced to the surface of the carbon black.

Next, Black Ink 1 and Black Ink 2 (comparative example) were prepared by employing the above Pigment dispersion 1 as follows.

Black Ink 1

| | |
|---|---|
| Pigment dispersion 1: | 30 parts |
| Ammonium benzoate: | 1 part |
| trimethylol propane: | 6 parts |
| glycerol: | 6 parts |
| diethylene glycol: | 6 parts |
| acetylene glycol ethyleneoxide adduct (ACETYLENOL EH, trade name, a product of KAWAKEN Fine Chemical, Ltd.): | 0.2 part |
| water: | to 100 parts |

Black Ink 2

| | |
|---|---|
| Pigment dispersion 1: | 30 parts |
| trimethylol propane: | 6 parts |
| glycerol: | 6 parts |
| diethylene glycol: | 6 parts |
| acetylene glycol ethyleneoxide adduct (ACETYLENOL EH, trade name, a product of KAWAKEN Fine Chemical, Ltd.): | 0.2 part |
| water: | to 100 parts |

Color inks were prepared by mixing and dissolving the following components by stirring. The solution was filtered through a microfilter having a pore size of 3 μm (available from Fujio Photo Film Co., Ltd) under pressure.

Yellow Ink 1

| | |
|---|---|
| C.I. Acid Yellow 23: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| water: | to 100 parts |

Magenta Ink 1

| | |
|---|---|
| C.I. Acid Red 52: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| water: | to 100 parts |

Cyan Ink 1

| | |
|---|---|
| C.I. Acid Blue 9: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| water: | to 100 parts |

EXAMPLE 1

An ink set was prepared by combining the above prepared inks, Black Ink 1, Yellow Ink 1, Magenta Ink 1 and Cyan Ink 1.

Comparative Example 1

An ink set comprised of the above prepared Black Ink 2, Yellow Ink 1, Magenta Ink 1 and Cyan Ink 1.

Further, following color inks were prepared by adding one of the dilvalent metal salts as the precipitating agents for the black pigment.

Yellow Ink 2

| | |
|---|---|
| C.I. Acid Yellow 23: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| calcium nitrate | 2 parts |
| water: | to 100 parts |

Magenta Ink 2

| | |
|---|---|
| C.I. Acid Red 52: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| magnesium nitrate | 2 parts |
| water: | to 100 parts |

Cyan Ink 2

| | |
|---|---|
| C.I. Acid Blue 2: | 3 parts |
| trimethylol propane: | 6 parts |
| 2-pyrrolidone: | 6 parts |
| acetylene glycol ethyleneoxide adduct (ACETYLENOL EH, trade name, a product of KAWAKEN Fine Chemical, Ltd.): | 1.0 part |
| magnesium nitrate | 2 parts |
| water: | to 100 parts |

EXAMPLE 2

An ink set comprised of the above prepared Black Ink 1, Yellow Ink 2, Magenta Ink 2 and Cyan Ink 2 was prepared.

The principal characteristics of the ink sets of Examples 1 and 2 and comparative Example 1 are shown in Table 1.

Experiment 1 (Streakiness of Both-way Recording)

With the inks in Examples 1 and 2, recording was carried out on a commercially available copying paper. As an ink jet recording apparatus used, the ink jet recording apparatus (trade name: BJF-800; a product of Canon) was used, which has an on-demand type multi-recording head to discharge ink by applying thermal energy to the ink in response to the recording signals.

Recording was carried out by the one-pass both-way recording with three different feeding amounts of yellow, magenta, cyan and black inks on the same place (the feeding amount of 100% duty is 20 ng for color ink and 30 ng for black ink per 1/600 inch×1/600 inch). The feeding amounts shown in this Example give grey colors locating between solid black and white. The following Table 2 shows the state of color unevenness and uniform feeling in both-way recording in Comparative Example 1, Examples 1 and 2.

<Evaluation of Streakiness of Both-way Recording>

With the feeding amount as shown in Table 2, recording was carried out on the commercially available copying paper in the order of black ink and then color ink or color ink and then black ink. Density unevenness according to application order, and uniform feeling of the formed image were visually observed and evaluated on the basis of the following evaluation criteria. The results are shown in Table 2.

Evaluation criteria on density unevenness
A: Density unevenness is hardly observed
B: Density unevenness is not observed in a minute region
C: Density unevenness is conspicuous
Evaluation criteria on uniform feeling:
A: No problem
B: If carefully observed, the uniform feeling is disturbed but practically no problem
C: Poor uniform feeling
Herein, evaluation was carried out leaving the record on the commercial copying paper for one hour.

Experiment 2 (Uniform Feeling in Two-pass Recording)

Two-pass recording was carried out on commercial copying paper by using the ink sets of the above Examples 1, 2, and Comparative Example 1. The ink-jet recording apparatus was the ink jet recording apparatus (trade name: BJF-800; a product of Canon) was used, which has an on-demand type multi-recording head to discharge ink by applying thermal energy to the ink in response to the recording signals. Recording was carried out by applying with one feeding amount of yellow, magenta, cyan and black inks on the same place (the feeding amount of 100% duty is 20 ng for color ink and 30 ng for black ink per 1/600 inch×1/600 inch). The feeding amount in this Example gives a grey color locating between solid black and white. In the two-pass recording which form image by scanning the same site twice, masks shown in FIGS. 21A to 21D were used for yellow, magenta, cyan, and black inks respectively. Table 3 shows the visual evaluation of uniform feeling of the images formed in Experiment 2 using the ink sets in Comparative Example 1, and Examples 1 and 2.

Evaluation criteria on uniform feeling:
A: No problem
B: If carefully observed, the uniform feeling is disturbed but practically no problem
C: Poor uniform feeling Experiment 3 (Uniform Feeling in Recording Using Two Heads for Black Ink)

One-pass recording was carried out on commercial copying paper by using the ink sets of the above Examples 1, 2, and Comparative Example 1. The ink-jet recording apparatus used was the ink jet recording apparatus (trade name: BJF-800; a product of Canon) was used, which has an on-demand type multi-recording head to discharge ink by applying thermal energy to the ink in response to the recording signals. Recording was carried out with a single feeding level of yellow, magenta, cyan and black inks on the same place (the feeding amount of 100% duty is 20 ng for color ink and 30 ng for black ink per 1/600 inch×1/600 inch). The feeding amount in this Example gives a grey color locating between solid black and white. In this experiment, are used two heads for black ink, the recording method which forms an image by scanning the same site by two heads as shown in FIG. 20 with a mask shown in FIG. 21A. Table 4 shows the visual evaluation of uniform feeling of the images formed in Experiment 3 using the ink sets in Comparative Example 1, and Examples 1 and 2.

Evaluation criteria on uniform feeling:
A: No problem
B: If carefully observed, the uniform feeling is disturbed but practically no problem
C: Poor uniform feeling

EXAMPLE 3

An ink set comprised of the above prepared Black Ink 1, Yellow Ink 1, Magenta Ink 1 and Cyan Ink 2 was prepared.

Comparative Example 2

An ink set comprised of the above prepared Black Ink 2, Yellow Ink 2, Magenta Ink 2 and Cyan Ink 2 was prepared.

The principal characteristics of the ink sets of Example 3 and Comparative Example 2 are shown in Table 5.

Experiment 4 (Bleeding, Haze, and Density difference)

Recording was carried out on commercial copying paper by using the ink sets of the above Examples 2, 3, and Comparative Examples 2 and 3. Three ink-jet recording apparatuses (trade name: BJF-600, BJF-800, BJF-850; products of Canon) were used, each of which has an on-demand type multi-recording head to discharge ink by applying thermal energy to the ink in response to the recording signals, and had been modified to apply color ink and black ink at 15 ng and 30 ng per 1/600 inch×1/600 inch respectively. Images formed with the above ink sets were evaluated on bleeding, haze and density difference between a black image region formed solely with black ink and a black image region formed with black ink and color ink.

In this Experiment, "Bk:100% duty, Col:15% duty" means that black ink is applied to 100% area of the image and color ink to 15% area of the image to form a black image. When color ink is applied to 15% area, in Example 2 and Comparative Example 2, each of C, M and Y is applied to 5% area, and in Example 3, only C is applied to 15% area.

Figure 26:
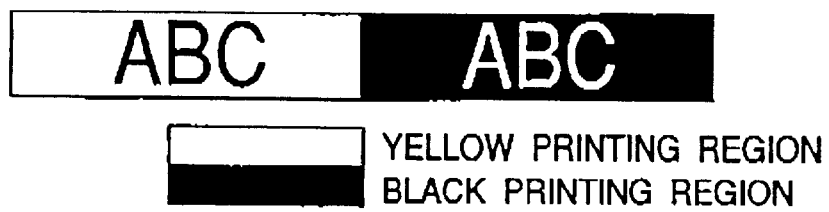
FIG. 26 illustrates recording patterns used in the evaluation test on bleeding and haze.

The recording pattern used was as shown in FIG. 26, where the color region and the black region are abutting each other, to visually evaluate bleeding at the boundary and haze in the black region. Here, the black region was processed to be Bk: 100% duty, Col: 15% duty.

Evaluation Criteria on Bleeding
A: No bleeding at the boundary
B: Bleeding is conspicuous at the boundary
C: Bleeding is substantially conspicuous at the boundary
Evaluation Criteria on Haze
A: No haze
B: Haze is somewhat conspicuous
C: Haze is conspicuous all over <Density Difference Between Black Regions>

Figure 27:
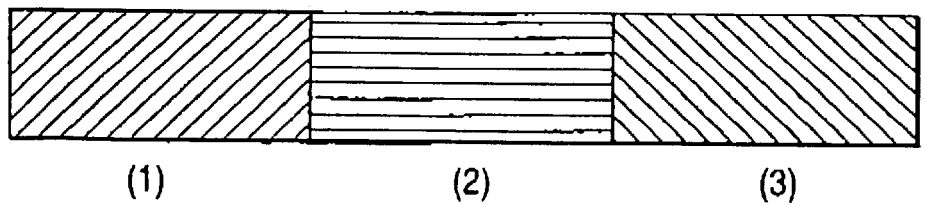
FIG. 27 illustrates a recording pattern used in the evaluation test on difference in image density of the black image regions formed by image processing.

As shown in FIG. 27, a pattern comprised of three abutting black regions was formed, where region 1 is Bk: 100%, region 2 is Bk:100% duty, Col: 5% duty, and region 3 is Bk; 100% duty and Col: 15% duty. Evaluation was carried out visually on the density difference between three regions and on the uniform feeling.

Evaluation Criteria on Density Difference
A: The boundary between black solid regions is not conspicuous, and image has uniform feeling B: The boundary between black solid regions is not conspicuous but image lacks uniform feeling C: The boundary between black solid regions is conspicuous The result is shown in Table 6.

As clearly seen from the above, when images are formed by using the ink sets according to the second aspect of the invention, not only bleeding and haze can be suppressed but also images having uniform feeling and free from density difference between black images regardless the black images are formed black ink only or formed by superimposing black ink and color ink.

As described above, according to each aspect of the present invention, occurrence of density unevenness and color due to different uniform feeling in the recorded image can be extremely effectively suppressed, even the image is formed by the both-way recording, or one-pass recording to shorten the recording time, or by the multi-pass recording to achieve high quality recording, in which recording order of black ink and color ink may be reversed part to part. As a result, high quality multicolor image can be formed in a short time.

In addition, according to the present invention, images having uniform feeling can be obtained in which density difference is not visually recognized between the black region formed solely with black ink and the black region formed by superimposing black ink and color ink.

Further, according to the present invention, images of more smooth monotone gradation can be easily obtained.

TABLE 1

|  | Black ink | | Color ink | |
| --- | --- | --- | --- | --- |
|  | Coloring material | Salt | Coloring material | Polyvalent metal salt |
| Example 1 | Anionic self-dispersible carbon black | Ammonium Benzoate | dye | None |
| Example 2 | Anionic self-dispersible carbon black | Ammonium Benzoate | dye | Calcium nitrate or Magnesium nitrate |
| Comp. Example | Anionic self-dispersible carbon black | None | dye | None |

TABLE 2

|  |  | Black 30% Color 90% | Black 60% Color 30% | Black 70% Color 15% |
| --- | --- | --- | --- | --- |
| Comp. Example 1 | Streakiness | B | C | B |
|  | Uniform feeling | C | C | C |
| Example 1 | Streakiness | B | A | A |
|  | Uniform feeling | B | B | A |
| Example 2 | Streakiness | A | A | A |
|  | Uniform feeling | A | A | A |

TABLE 3

|  |  | Black 30% Color 90% |
| --- | --- | --- |
| Comp. Example 1 | Uniform feeling | C |
| Example 1 | Uniform feeling | B |
| Example 2 | Uniform feeling | A |

TABLE 4

|  |  | Black 30% Color 90% |
| --- | --- | --- |
| Comp. Example 1 | Uniform feeling | C |
| Example 1 | Uniform feeling | B |
| Example 2 | Uniform feeling | A |

TABLE 5

|  | Black ink | | Color ink | |
| --- | --- | --- | --- | --- |
|  | Coloring material | Salt | Coloring material | Polyvalent metal salt |
| Example 3 | Anionic self-dispersible carbon black | Yes | Dye | Only cyan ink |
| Comp. Example 2 | Anionic self-dispersible carbon black | No | Dye | Every ink |

TABLE 6

|  | Bleeding | Haze | Density difference |
| --- | --- | --- | --- |
| Example 2 | A | A | A |
| Example 3 | A | A | A |
| Comp. Example 1 | C | B | B |
| Comp. Example 2 | A | A | C |

What is claimed is:

1. A method of recording on a recording medium a multi-color image including a first image region and a second image region with a black ink and a color ink, comprising the steps of:
   (i) forming the first image region by applying the black ink, and then applying the color ink so as to overlap each other; and
   (ii) forming the second image region by applying the color ink, and then applying the black ink so as to overlap each other;
   wherein the black ink contains a salt selected from the group consisting of $(M1)_2SO_4$, $CH_3COO(M1)$, $Ph-COO(M1)$, $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium and a pigment dispersed in the aqueous medium by the action of an ionic group, and the color ink contains a dye.

2. The method according to claim 1, wherein the black ink has a Ka value by the Bristow method of less than 1.5 $ml \cdot m^{-2} \cdot msec^{-1/2}$ and the color ink has a Ka value by the Bristow method of 5 $ml \cdot m^{-2} \cdot msec^{-1/2}$ or more.

3. The method according to claim 2, wherein the black ink has a Ka value by the Bristow method of 0.2 ml·m$^{-2}$·msec$^{-1/2}$ or more and less than 1.5 ml·m$^{-2}$·msec$^{-1/2}$.

4. The method according to claim 1, wherein the pigment of the black ink is a carbon black, and the carbon black has at least one kind of hydrophilic group, as the ionic group, attached on its surface directly or via an atomic group.

5. The method according to claim 1, wherein the pigment of the black ink is a carbon black and the black ink further contains a dispersing agent having the ionic group.

6. The method according to claim 4 or 5, wherein the carbon black is present in the black ink in such a concentration that an image of a prescribed optical density is formed when the black ink alone is provided to a recording medium by an ink jet method, but no recorded image of the prescribed optical density can be obtained when the black ink contains no salt.

7. The method according to claim 1, wherein the dye of the color ink is an acid dye or a direct dye.

8. The method according to claim 1, wherein the color ink contains a component which destabilizes the dispersion stability of the pigment of the black ink when the color ink and the black ink are mixed, the component being a dye, an additive, or a dye and an additive.

9. The method according to claim 8, wherein the black ink contains an anionic group as the ionic group, and the color ink contains polyvalent metal salts as the additive.

10. The method according to claim 9, wherein the polyvalent metal salt comprises at least one polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

11. The method according to claim 9 or 10, wherein the color ink contains the polyvalent metal salt at 0.1 to 15% by weight of a total weight of the color ink.

12. The method according to claim 8, wherein the black ink contains an anionic group as the ionic group, and the color ink contains a dye having a cationic group as the dye.

13. The method according to claim 12, wherein the color ink contains the dye having the cationic group at 0.1 to 10% by weight of a total weight of the color ink.

14. The method according to claim 8, wherein the black ink contains a cationic group as the ionic group, and the color ink contains a dye having an anionic group as the dye.

15. The method according to claim 14, wherein the color ink contains the dye having the anionic group at 0.1 to 10% by weight of a total weight of the color ink.

16. The method according to claim 8, wherein the pigment of the black ink exists stably at a pH of 3 to 7 and the pH of the color ink is 7 to 10.

17. The method according to claim 8, wherein the pigment of the black ink exists stably at a pH of 7 to 11 and the pH of the color ink is 3 to 6.

18. A method of improving quality of a multi-color image including a first image region and a second image region, by using an ink-jet recording head separately containing a black ink and a color ink, comprising the steps of:
(i) forming the first image region by applying the black ink, and then applying the color ink so as to overlap each other; and
(ii) forming the second image region by applying the color ink, and then applying the black ink so as to overlap each other;
wherein the black ink contains a salt selected from the group consisting of $(M1)_2SO_4$, $CH_3COO(M1)$, $Ph$—$COO(M1)$, $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium and a pigment dispersed in the aqueous medium by the action of an ionic group, and the color ink contains a dye.

19. The method according to claim 18, wherein the black ink has a Ka value by the Bristow method of less than 1.5 ml·m$^{-2}$·msec$^{-1/2}$ and the color ink has a Ka value by the Bristow method of 5 ml·m$^{-2}$·msec$^{-1/2}$ or more.

20. The method according to claim 19, wherein the black ink has a Ka value by the Bristow method of 0.2 ml·m$^{-2}$·msec$^{-1/2}$ or more and less than 1.5 ml·m$^{-2}$·msec$^{-1/2}$.

21. The method according to claim 18, wherein the pigment of the black ink is a carbon black, and the carbon black has at least one kind of hydrophilic group, as the ionic group, attached on its surface directly or via an atomic group.

22. The method according to claim 21, wherein the carbon black is present in the black ink in such a concentration that an image of a prescribed optical density is formed when the black ink alone is provided to a recording medium by an ink jet method, but no recorded image of the prescribed optical density can be obtained when the black ink contains no salt.

23. The method according to claim 18, wherein the dye of the color ink is an acid dye or a direct dye.

24. The method according to claim 18, wherein the color ink contains a component which destabilizes the dispersion stability of the pigment of the black ink when the color ink and the black ink are mixed, the component being a dye, an additive, or a dye and an additive.

25. The method according to claim 24, wherein the black ink contains an anionic group as the ionic group, and the color ink contains a polyvalent metal salt as the additive.

26. The method according to claim 25, wherein the polyvalent metal salt comprises at least one polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

27. The method according to claim 25 or 26, wherein the color ink contains the polyvalent metal salt at 0.1 to 15% by weight of a total weight of the color ink.

28. The method according to claim 25, wherein the black ink contains a cationic group as the ionic group, and the color ink contains a dye having an anionic group as the dye.

29. The method according to claim 28, wherein the color ink contains the dye having the anionic group at 0.1 to 10% by weight of a total weight of the color ink.

30. The method according to claim 24, wherein the black ink contains an anionic group as the ionic group, and the color ink contains a dye having a cationic group as the dye.

31. The method according to claim 30, wherein the color ink contains the dye having the cationic group at 0.1 to 10% by weight of a total weight of the color ink.

32. The method according to claim 24, wherein the pigment of the black ink exists stably at a pH of 3 to 7 and the pH of the color ink is 8 to 11.

33. The method according to claim 24, wherein the pigment of the black ink exists stably at a pH of 7 to 11 and the pH of the color ink is 3 to 6.

34. An image recording apparatus comprising:
(i) an ink jet recording head from which a black ink and a color ink are discharged separately to a recording medium; and
(ii) means for carrying a recording medium to a position where the recording head carries out recording;
wherein the black ink contains a salt selected from the group consisting of $(M1)_2SO_4$, $CH_3COO(M1)$, $Ph$—$COO(M1)$, $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium and a pigment dispersed in the aqueous medium by the action of an ionic group, and the color ink contains a dye.

35. The image recording apparatus according to claim 34, wherein the means (ii) comprises a paper delivery roller driven by a motor.

36. The image recording apparatus according to claim 35, further comprising a means for moving the recording head to-and-fro in a direction perpendicular to the direction of carrying the recording medium, wherein the moving means comprises a carriage, a guide shaft and a belt driven by a motor, the carriage engaging with the guide shaft in a slidable manner, a part of the carriage being connected to the belt.

37. The apparatus according to claim 34, wherein the black ink has a Ka value by the Bristow method of less than 1.5 ml·m$^{-2}$·msec$^{-\frac{1}{2}}$ and the color ink has a Ka value by the Bristow method of 5 ml·m$^{-2}$·msec$^{-\frac{1}{2}}$ or more.

38. The apparatus according to claim 34, wherein the black ink has a Ka value by the Bristow method of 0.2 ml·m$^{-2}$·msec$^{-\frac{1}{2}}$ or more and less than 1.5 ml·m$^{-2}$·msec$^{-\frac{1}{2}}$.

39. The apparatus according to claim 34, wherein the pigment of the black ink is a carbon black, and the carbon black has at least one kind of hydrophilic group, as the ionic group, attached on its surface directly or via an atomic group.

40. The apparatus according to claim 39, wherein the carbon black is present in the black ink in such a concentration that an image of a prescribed optical density is formed when the black ink alone is provided to a recording medium by an ink jet method, but no recorded image of the prescribed optical density can be obtained when the black ink contains no salt.

41. The apparatus according to claim 34, wherein the dye of the color ink is an acid dye or a direct dye.

42. The apparatus according to claim 34, wherein the color ink contains a component which destabilizes the dispersion stability of the pigment of the black ink when the color ink and the black ink are mixed, the component being a dye, an additive, or a dye and an additive.

43. The apparatus according to claim 42, wherein the black ink contains an anionic group as the ionic group, and the color ink contains a polyvalent metal salts as the additive.

44. The apparatus according to claim 43, wherein the polyvalent metal salt comprises at least one polyvalent metal cation selected from the group consisting of Mg$^{2+}$, Ca$^{2+}$, Cu$^{2+}$, Co$^{2+}$, Ni$^{2+}$, Fe$^{2+}$, La$^{3+}$, Nd$^{3+}$, Y$^{3+}$ and Al$^{3+}$.

45. The apparatus according to claim 43 or 44, wherein the color ink contains the polyvalent metal salt at 0.1 to 15% by weight of a total weight of the color ink.

46. The apparatus according to claim 42, wherein the black ink contains an anionic group as the ionic group, and the color ink contains a dye having a cationic group as the dye.

47. The apparatus according to claim 46, wherein the color ink contains the dye having the cationic group at 0.1 to 10% by weight of a total weight of the color ink.

48. The apparatus according to claim 42, wherein the black ink contains a cationic group as the ionic group, and the color ink contains a dye having an anionic group as the dye.

49. The apparatus according to claim 48, wherein the color ink contains the dye having the anionic group at 0.1 to 10% by weight of a total weight of the color ink.

50. The apparatus according to claim 42, wherein the pigment of the black ink exists stably at a pH of 3 to 7 and the pH of the color ink is 8 to 11.

51. The apparatus according to claim 42, wherein the pigment of the black ink exists stably at a pH of 7 to 11 and the pH of the color ink is 3 to 6.

52. An ink set comprising a black ink and a color ink, wherein the black ink contains a salt selected from the group consisting of (M1)$_2$SO$_4$, CH$_3$COO(M1), Ph—COO(M1), (M1)NO$_3$, (M1)Cl, (M1)Br, (M1)I, (M1)$_2$SO$_3$ and (M1)$_2$CO$_3$ where M1 is selected from the group consisting of an alkali metal, ammonium or an organo-ammonium, an aqueous medium and a pigment dispersed in the aqueous medium by the action of an ionic group, and the color ink contains a component which destabilizes the dispersion stability of the pigment of the black ink when the color ink and the black ink are mixed, the component being a dye, an additive, or a dye and an additive.

53. The ink set according to claim 52, wherein the black ink has a Ka value by the Bristow method of less than 1.5 ml·m$^{-2}$·msec$^{-\frac{1}{2}}$ and the color ink has a Ka value by the Bristow method of 5 ml·m$^{-2}$·msec$^{-\frac{1}{2}}$ or more.

54. The ink set according to claim 52, wherein the black ink has a Ka value by the Bristow method of 0.2 ml·m$^{-2}$·msec$^{-\frac{1}{2}}$ or more and less than 1.5 ml·m$^{-2}$·msec$^{-\frac{1}{2}}$.

55. The ink set according to claim 52, wherein the pigment of the black ink is a carbon black, and the carbon black has at least one kind of hydrophilic group, as the ionic group, attached on its surface directly or via an atomic group.

56. The ink set according to claim 55, wherein the carbon black is present in the black ink in such a concentration that an image of a prescribed optical density is formed when the black ink alone is provided to a recording medium by an ink jet method, but no recorded image of the prescribed optical density can be obtained when the black ink contains no salt.

57. The ink set according to claim 52, wherein the dye of the color ink is an acid dye or a direct dye.

58. The ink set according to claim 52, wherein the black ink contains an anionic group as the ionic group, and the color ink contains a polyvalent metal salts as the additive.

59. The ink set according to claim 58, wherein the polyvalent metal salt comprises at least one polyvalent metal cation selected from the group consisting of Mg$^{2+}$, Ca$^{2+}$, Cu$^{2+}$, Co$^{2+}$, Ni$^{2+}$, Fe$^{2+}$, La$^{3+}$, Nd$^{3+}$, Y$^{3+}$ and Al$^{3+}$.

60. The ink set according to claim 58 or 59, wherein the color ink contains the polyvalent metal salt at 0.1 to 15% by weight of a total weight of the color ink.

61. The ink set according to claim 60, wherein the black ink contains an anionic group as the ionic group, and the color ink contains a dye having a cationic group as the dye.

62. The ink set according to claim 61, wherein the color ink contains the dye having the cationic group at 0.1 to 10% by weight of a total weight of the color ink.

63. The ink set according to claim 52, wherein the black ink contains a cationic group as the ionic group, and the color ink contains a dye having an anionic group as the dye.

64. The ink set according to claim 63, wherein the color ink contains the dye having the anionic group at 0.1 to 10% by weight of a total weight of the color ink.

65. The ink set according to claim 52, wherein the pigment of the black ink exists stably at a pH of 3 to 7 and the pH of the color ink is 8 to 11.

66. The ink set according to claim 52, wherein the pigment of the black ink exists stably at a pH of 7 to 11 and the pH of the color ink is 3 to 6.

67. A method for forming a monotone image with an ink set according to claim 52.

68. A recording unit comprising a black ink holding part which holds an black ink, a color ink holding part which holds a color ink and an ink-jet head from which the black ink and the color ink are ejected respectively, wherein the black ink contains a salt selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium and a pigment dispersed in the aqueous medium by the action of an ionic group, and the color ink contains a component which destabilizes the dispersion stability of the pigment of the black ink when the color ink and the black ink are mixed, the component being a dye, an additive, or a dye and an additive.

69. The recording unit according to claim 68, wherein the black ink has a Ka value by the Bristow method of less than 1.5 ml·m$^{-2}$·msec$^{-\frac{1}{2}}$ and the color ink has a Ka value by the Bristow method of 5 ml·m$^{-2}$·msec$^{-\frac{1}{2}}$ or more.

70. The recording unit according to claim 68 or 69, wherein the black ink has a Ka value by the Bristow method of 0.2 ml·m$^{-2}$·msec$^{-\frac{1}{2}}$ or more and less than 1.5 ml·m$^{-2}$·msec$^{-\frac{1}{2}}$.

71. The recording unit according to claim 68, wherein the pigment of the black ink is a carbon black, and the carbon black has at least one kind of hydrophilic group, as the ionic group, attached on its surface directly or via an atomic group.

72. The recording unit according to claim 71, wherein the carbon black is present in the black ink in such a concentration that an image of a prescribed optical density is formed when the black ink alone is provided to a recording medium by an ink jet method, but no recorded image of the prescribed optical density can be obtained when the black ink contains no salt.

73. The recording unit according to claim 68, wherein the dye of the color ink is an acid dye or a direct dye.

74. The recording unit according to claim 68, wherein the black ink contains an anionic group as the ionic group, and the color ink contains a polyvalent metal salts as the additive.

75. The recording unit according to claim 74, wherein the polyvalent metal salt comprises at least one polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

76. The recording unit according to claim 74 or 75, wherein the color ink contains the polyvalent metal salt at 0.1 to 15% by weight of a total weight of the color ink.

77. The recording unit according to claim 68, wherein the black ink contains an anionic group as the ionic group, and the color ink contains a dye having a cationic group as the dye.

78. The recording unit according to claim 77, wherein the color ink contains the dye having the cationic group at 0.1 to 10% by weight of a total weight of the color ink.

79. The recording unit according to claim 68, wherein the black ink contains a cationic group as the ionic group, and the color ink contains a dye having an anionic group as the dye.

80. The recording unit according to claim 79, wherein the color ink contains the dye having the anionic group at 0.1 to 10% by weight of a total weight of the color ink.

81. The recording unit according to claim 68, wherein the pigment of the black ink exists stably at a pH of 3 to 7 and the pH of the color ink is 8 to 11.

82. The recording unit according to claim 68, wherein the pigment of the black ink exists stably at a pH of 7 to 11 and the pH of the color ink is 3 to 6.

83. The recording unit according to claim 68, wherein the ink jet head discharges the ink by applying thermal energy thereto.

84. The recording unit according to claim 68, wherein the ink jet head discharges the ink by applying mechanical energy thereto.

85. A method of forming on a recording medium an image including a first image region and a second image region, comprising the steps of:

(i) forming the first image region by applying a black ink, and (ii) forming the second image region by applying the black ink and a color ink so as to overlap each other;

wherein the black ink contains a salt selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium, and a pigment dispersed in the aqueous medium by the action of an ionic group, and the color ink contains a component which destabilizes the dispersion stability of the pigment of the black ink when the color ink and the black ink are mixed, the component being a dye, an additive, or a dye and an additive.

86. The method according to claim 85, wherein the additive is a salt of a multivalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$.

87. The method according to claim 85 or 86, wherein the black ink has a Ka value by the Bristow method of 0.2 ml·m$^{-2}$·msec$^{-\frac{1}{2}}$ or more and less than 1.5 ml·m$^{-2}$·msec$^{-\frac{1}{2}}$.

88. The method according to claim 85, wherein the black ink has a Ka value by the Bristow method of less than 1.5 ml·m$^{-2}$·msec$^{-\frac{1}{2}}$ and the color ink has a Ka value by the Bristow method of 5 ml·m$^{-2}$·msec$^{-\frac{1}{2}}$ or more.

89. A method for improving quality of an image including a first black image region and a second black image region, comprising the steps of:

(i) forming the first black image region by applying a black ink to a recording medium, and (ii) forming the second black image region by applying the black ink and a color ink so as to overlap each other;

wherein the black ink contains a salt selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$ and $(M1)_2CO_3$ where M1 is selected from the group consisting of an alkali metal, ammonium or an organo-ammonium, an aqueous medium, and a pigment dispersed in the aqueous medium by the action of an ionic group, and the color ink contains a component which destabilizes the dispersion stability of the pigment of the black ink when the color ink and the black ink are mixed, the component being a dye, an additive, or a dye and an additive.

* * * * *

UNITED STATES PATENT AND TRADEMARK OFFICE
CERTIFICATE OF CORRECTION

PATENT NO. : 6,540,329 B1
DATED : April 1, 2003
INVENTOR(S) : Takumi Kaneko et al.

It is certified that error appears in the above-identified patent and that said Letters Patent is hereby corrected as shown below:

Title page,
Item [57], ABSTRACT,
Line 2, "an" should read -- a --.

Column 33,
Line 49, "7 to 10." should read -- 8 to 11. --.

Column 34,
Line 9, "0.2 ml·m⁻" should read -- $0.2 \text{ ml} \cdot \text{m}^{-2} \cdot \text{msec}^{-\frac{1}{2}}$ --.
Line 10, "$2 \cdot \text{msec}^{-\frac{1}{2}}$" should be deleted.

Column 36,
Line 21, "0.2 ml·m⁻" should read -- $0.2 \text{ ml} \cdot \text{m}^{-2} \cdot \text{msec}^{-\frac{1}{2}}$ --.
Line 22, "$2 \cdot \text{msec}^{-\frac{1}{2}}$" should be deleted.
Line 67, "an" should read -- a --.

Column 37,
Line 20, "1.5 ml·m⁻" should read -- $1.5 \text{ ml} \cdot \text{m}^{-2} \cdot \text{msec}^{-\frac{1}{2}}$ --.
Line 21, "$2 \cdot \text{msec}^{-\frac{1}{2}}$" should be deleted.

Signed and Sealed this

Twenty-seventh Day of July, 2004

JON W. DUDAS
*Acting Director of the United States Patent and Trademark Office*